United States Patent
Park et al.

(10) Patent No.: US 9,838,865 B2
(45) Date of Patent: Dec. 5, 2017

(54) TECHNIQUES FOR PROVIDING NETWORK ACCESS

(71) Applicant: QUALCOMM Incorporated, San Diego, CA (US)

(72) Inventors: Edwin Chongwoo Park, San Diego, CA (US); Soumya Das, San Diego, CA (US)

(*) Notice: Subject to any disclaimer, the term of this patent is extended or adjusted under 35 U.S.C. 154(b) by 0 days.

(21) Appl. No.: 15/040,752

(22) Filed: Feb. 10, 2016

(65) Prior Publication Data

US 2017/0230818 A1    Aug. 10, 2017

(51) Int. Cl.
| | | |
|---|---|---|
| H04W 8/02 | (2009.01) | |
| H04W 48/18 | (2009.01) | |
| H04W 8/26 | (2009.01) | |
| H04W 84/04 | (2009.01) | |

(52) U.S. Cl.
CPC ............ *H04W 8/02* (2013.01); *H04W 8/26* (2013.01); *H04W 48/18* (2013.01); *H04W 84/045* (2013.01)

(58) Field of Classification Search
CPC ...... H04L 69/24; H04W 16/14; H04W 24/00; H04W 28/16; H04W 4/22
See application file for complete search history.

(56) References Cited

U.S. PATENT DOCUMENTS

| | | | |
|---|---|---|---|
| 8,279,786 B1* | 10/2012 | Smith | .............. H04W 16/14 370/310 |
| 9,088,989 B2 | 7/2015 | Smith et al. | |
| 9,374,662 B2* | 6/2016 | Siomina | ............... G01S 5/0205 |
| 9,462,477 B2* | 10/2016 | Ahmad | .................. H04W 4/26 |
| 9,467,908 B2* | 10/2016 | Jeong | .................. H04W 36/14 |
| 9,510,245 B2* | 11/2016 | Karlsson | .......... H04W 36/0022 |
| 9,615,318 B2* | 4/2017 | Morper | ................ H04W 48/18 |

(Continued)

FOREIGN PATENT DOCUMENTS

| | | |
|---|---|---|
| EP | 2 421 302 A1 | 2/2012 |
| WO | WO-2015/080796 A1 | 6/2015 |

OTHER PUBLICATIONS

Imran A., et al., "Challenges in 5G: How to Empower SON with Big Data for Enabling 5G," IEEE Network, Nov./Dec. 2014, pp. 27-33.

(Continued)

*Primary Examiner* — Liton Miah
(74) *Attorney, Agent, or Firm* — Qualcomm IP Dept.; James Hunt Yancey, Jr.

(57) ABSTRACT

The present disclosure describes various techniques to provide network access to a user equipment by using network infrastructure and/or wireless spectrum from an asset operator. In an aspect, a network device associated with the asset operator may receive a request for wireless wide area network (WWAN) access for a UE. The network device may identify the UE as a subscriber of an operator based at least in part on the request, where the operator is different from the asset operator, and where the network device is configured to provide WWAN access to subscribers of the operator via a core network associated with the operator based at least in part on a services agreement between the operator and the asset operator. The network device may then provide WWAN access to the UE in response to identifying that the UE is a subscriber of the operator.

34 Claims, 18 Drawing Sheets

(56) References Cited

U.S. PATENT DOCUMENTS

| | | | |
|---|---|---|---|
| 2005/0213566 A1* | 9/2005 | Jutila | H04W 48/18 370/352 |
| 2009/0161614 A1* | 6/2009 | Grandblaise | H04W 16/06 370/329 |
| 2012/0077510 A1* | 3/2012 | Chen | H04W 28/26 455/452.1 |
| 2013/0044614 A1* | 2/2013 | Aguirre | H04W 28/24 370/252 |
| 2013/0114432 A1 | 5/2013 | Haynes | |

OTHER PUBLICATIONS

Soldani D., et al., "5G Networks: End-to-End Architecture and Infrastructure," Guest Editorial, IEEE Communications Magazine, Nov. 2014, pp. 62-64.

"3rd Generation Partnership Project; Technical Specification Group Services and System Aspects; Network Sharing; Architecture and functional description (Release 11 )", 3GPP Draft; 23251 B20⁻CRS⁻IMPLEMENTED,3rd Generation Partnership Project (3GPP), Mobile Competence Centre; 650, Route Des Lucioles; F-06921 Sophia-Antipolis Cedex; France, Jun. 22, 2012 (Jun. 22, 2012), XP050682639, Retrieved from the Internet:URL:http://www.3gpp.org/ftp/tsg⁻sa/WG2⁻Arch/Latest⁻SA2⁻Specs/DRAFT⁻INTERIM/Archive/ [retrieved on Jun. 22, 2012.

International Search Report and Written Opinion—PCT/US2016/063827—ISA/EPO—Feb. 7, 2017. (15 total pages).

* cited by examiner

TECHNIQUES FOR PROVIDING NETWORK ACCESS

BACKGROUND

The present disclosure relates generally to communications systems, and more particularly, to techniques for providing network access.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In one example, 5G networks or systems (i.e., $5^{th}$ generation mobile networks or wireless systems) are being developed to provide better capabilities, including faster speeds and new use case scenarios (e.g., support for Internet-of-Things or IoT deployments), than the capabilities supported by networks implemented using current standards (e.g., 3G/4G). These newer networks or systems may need to provide improvements in wireless standards and technologies to enable novel business or operating models that are currently not feasible.

For instance, subscribers of a network operator may be provided network access over wireless spectrum and network infrastructure owned by the network operator. In some instances, the network operator may lease network resources or assets, to a third-party operator, such as a mobile virtual network operator (MVNO), which has a group of subscribers but does not own its own wireless spectrum or network infrastructure. New arrangements and techniques may be needed, however, to enable more flexible network access configurations in which different operators provide access to different resources or assets (e.g., wireless spectrum and/or network infrastructure) such that subscribers can have seamless and/or cost-effective service as they move about geographic regions, participate in various activities, or attend different types of events, venues, or establishments.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, various methods, computer-readable medium, and apparatuses are provided. For instance, the present disclosure describes a method of wireless communications, which includes receiving, at a network device associated with an asset operator, a request for wireless wide area network (WWAN) access for a user equipment (UE). In addition, the method may include identifying the UE as a subscriber of an operator based at least in part on the request, where the operator is different from the asset operator, and where the network device is configured to provide WWAN access to subscribers of the operator via a core network associated with the operator based at least in part on a services agreement between the operator and the asset operator. The method may also include providing WWAN access to the UE in response to identifying that the UE is a subscriber of the operator. In an example, the operator may be a mobile virtual network operator (MVNO) or a home network operator, and the asset operator may provide access to one or both of network infrastructure or wireless spectrum assets to subscribers of the MVNO or the home network operator.

In another aspect, the present disclosure describes a computer-readable medium storing computer executable code for wireless communications, which include code for receiving, at a network device associated with an asset operator, a request for WWAN access for a UE. In addition, the computer-readable medium may include code for identifying the UE as a subscriber of an operator based at least in part on the request, where the operator is different from the asset operator, and where the network device is configured to provide WWAN access to subscribers of the operator via a core network associated with the operator based at least in part on a services agreement between the operator and the asset operator. The computer-readable medium may also include code for providing WWAN access to the UE in response to identifying that the UE is a subscriber of the operator. In an example, the operator may be an MVNO or a home network operator, and the asset operator may provide access to one or both of network infrastructure or wireless spectrum assets to subscribers of the MVNO or the home network operator.

In yet another aspect, the present disclosure describes an apparatus for wireless communication, which includes a transceiver, a memory configured to store instructions; and a processor in communication with the transceiver and the memory. The processor and the memory configured to execute the instructions to: receive, at a network device associated with an asset operator and via the transceiver, a request for WWAN access for a UE. In addition, the processor and the memory may be configured to identify the UE as a subscriber of an operator based at least in part on the request, where the operator is different from the asset operator, and where the network device is configured to provide WWAN access to subscribers of the operator via a core network associated with the operator based at least in part on a services agreement between the operator and the asset operator. The processor and the memory may be further configured to provide WWAN access to the UE via the transceiver in response to identifying that the UE is a subscriber of the operator. In an example, the operator may be an MVNO or a home network operator, and the asset operator may provide access to one or both of network infrastructure or wireless spectrum assets to subscribers of the MVNO or the home network operator.

In another aspect, the present disclosure describes a method, which includes receiving, at a UE subscribed to an operator, broadcast information from a network device associated with an asset operator different from the operator. In addition, the method may include identifying, based on the broadcast information, the asset operator as one of one or more asset operators supported by the UE as configured by the operator. The method may further include transmitting, to the network device, a request for WWAN access in response to identifying that the asset operator is one of the one or more asset operators supported by the UE, where the network device is configured to provide WWAN access to subscribers of the operator via a core network associated with the operator based at least in part on a services agreement between the operator and the asset operator. The method may further include receiving, from the network device, information from a server of the operator, the information being provided by the server in response to the request and to establish a connection for WWAN access between the network device and the UE. Moreover, the UE may then establish the connection with the network device for WWAN access.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatuses and methods. These apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. In an aspect, any of these elements may refer to one of the parts that make up a system and may be divided into other elements.

Figure 3:
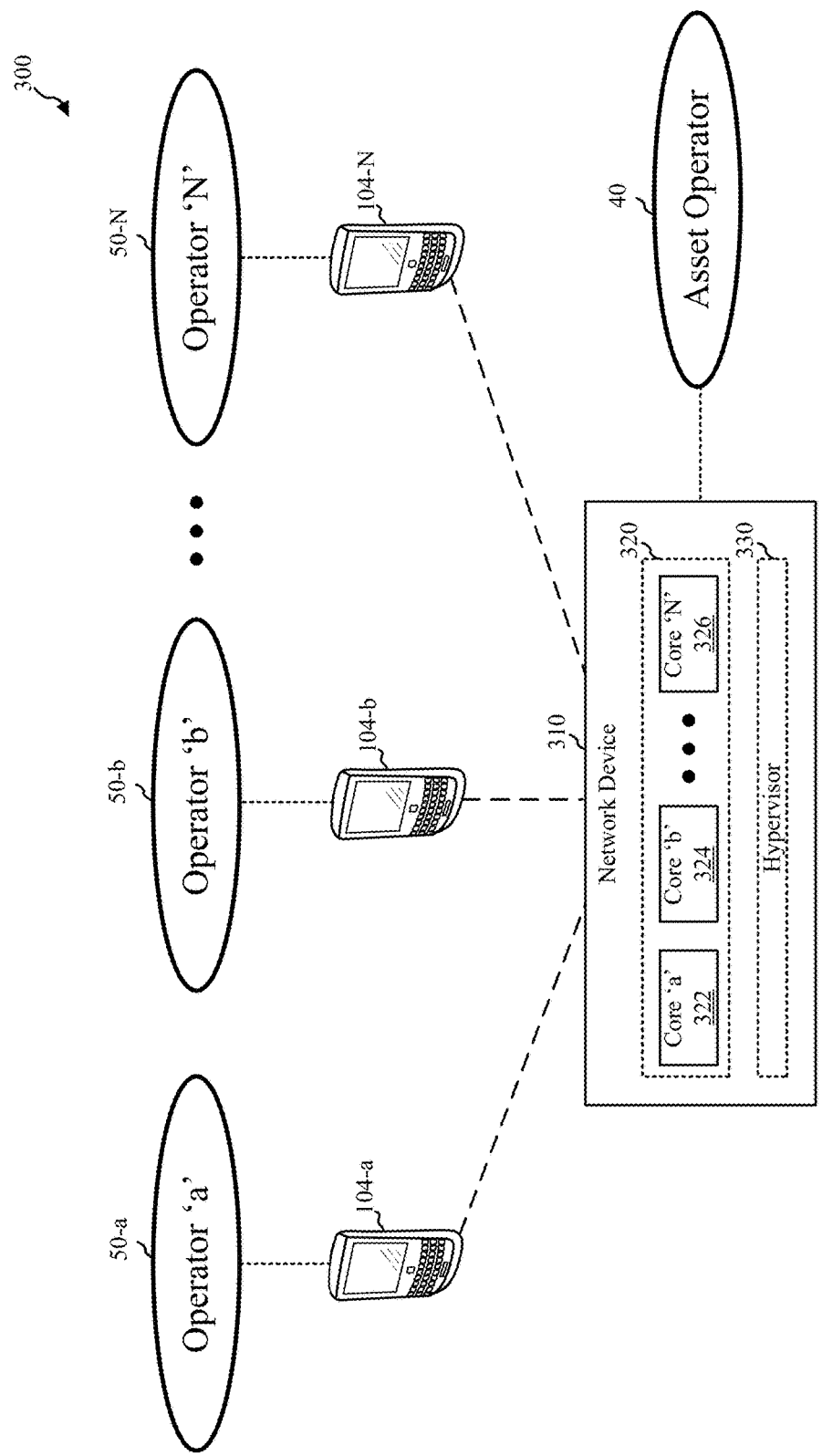
FIG. 3 is a diagram illustrating an example of a network device that supports traffic for multiple operators.
Figure 5:
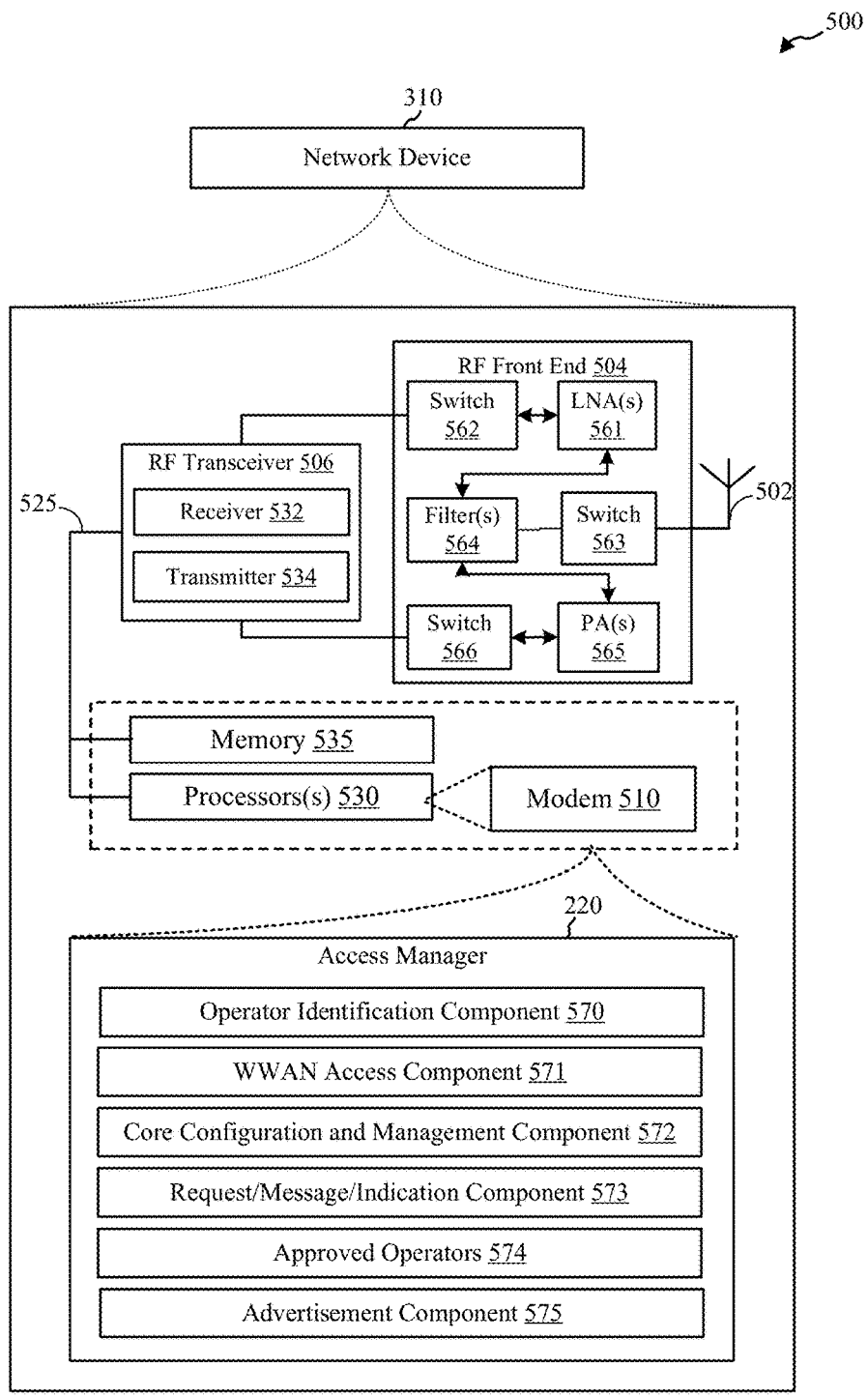
FIG. 5 is a block diagram illustrating an example of a network device for an asset operator.
Figure 6:
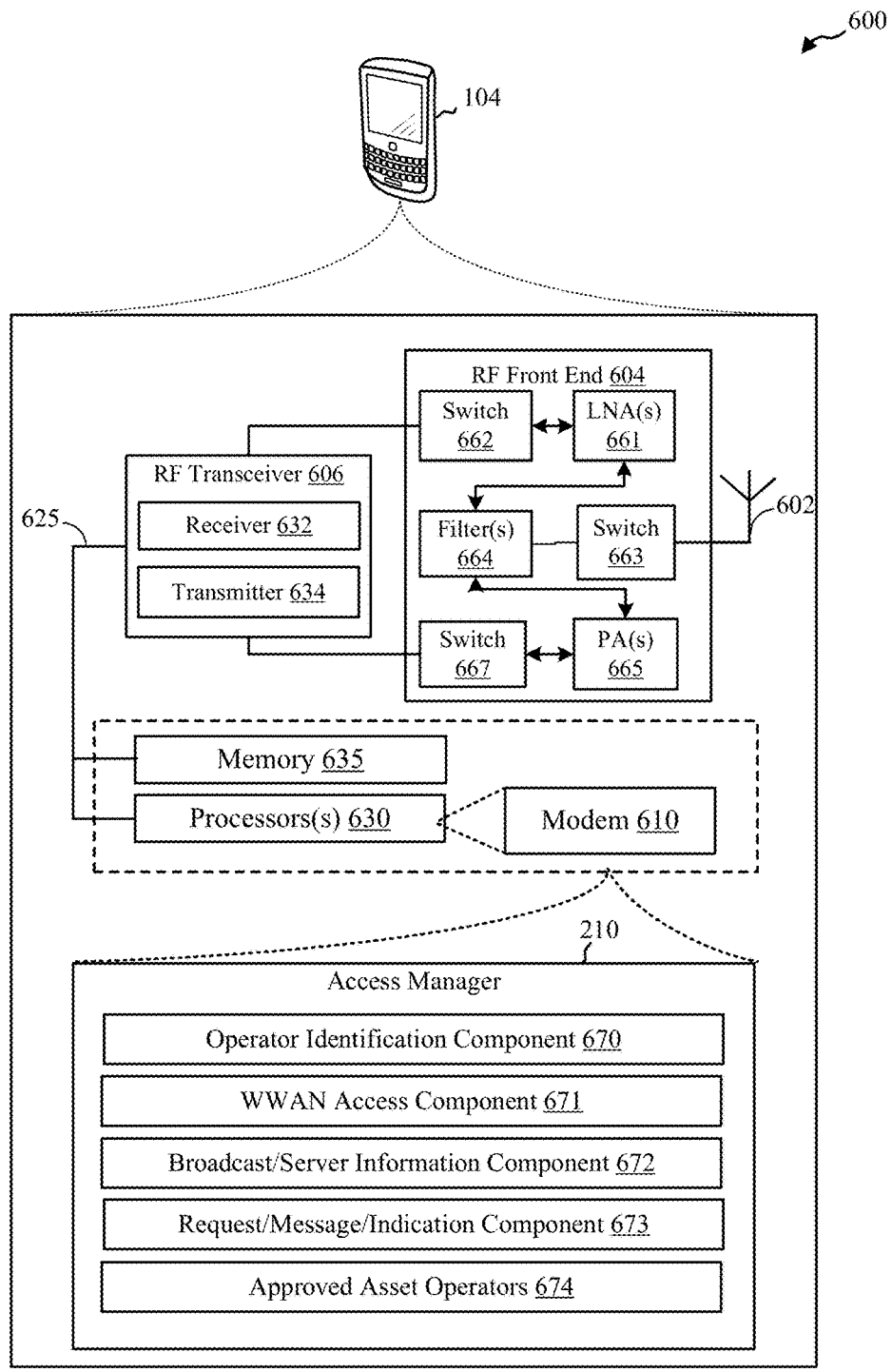
FIG. 6 is a block diagram illustrating an example of a user equipment (UE) that supports network access via different operators.
Figure 7:
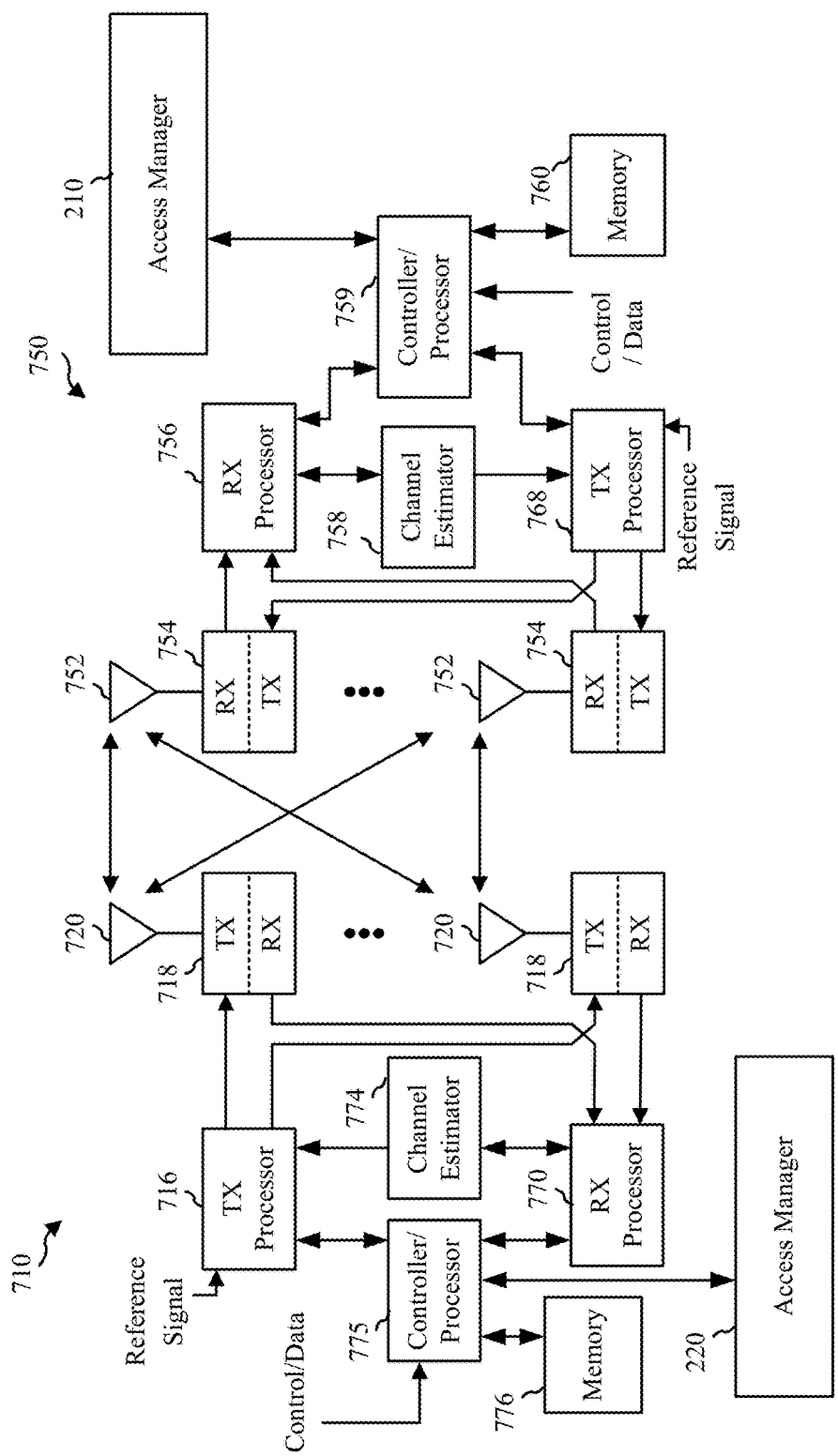
FIG. 7 is a diagram illustrating an example of a network device and a UE in an access network.

By way of example, an element, or any portion of an element, or any combination of elements may be implemented as a "processing system" that includes one or more processors (see e.g., processing system 320 in FIG. 3 and processors in FIGS. 5-7). Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium (e.g., non-transitory computer-readable medium). Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In an aspect of the present disclosure, improvements in wireless standards and technology (e.g., 5G networks and systems) may enable new configurations, operations, and/or business models where third party entities can lease or otherwise provide access through their network infrastructure (e.g., small cell, backhaul, core network (CN), sites) and/or wireless spectrum to subscribers of MVNOs and/or to subscribers of network operators. A third party entity may refer to an asset operator, sometimes referred to as an inverse-MVNO or i-MVNO, that owns, controls, and/or otherwise provides access to assets including network infrastructure assets and/or wireless spectrum assets, such that MVNO and/or network operator subscribers can have seamless home network access in locations, events, and/or at times where the MVNO or the network operator does not provide wireless wide area network (WWAN) service (or its service is poor or unreliable).

Other technologies may be used for similar operations but are different in the service they provide, the configuration of the assets that are being offered, and/or the arrangements and services that are possible between different operators, such as dynamic configurations, network resource advertisement, and/or auction and reverse auction of resources. As such, these other technologies do not provide the flexibility, nor do they rely on improvements in standards and technology offered by 5G wireless networks or mobile systems.

In examples of other technologies that differ from the techniques described herein, in roaming operations users or subscribers are on non-operator networks. In MVNOs, operators have no assets other than customers in a localized area. For managed services, a third party runs operations of an operator. In LTE over unlicensed spectrum (e.g., LTE-U) or licensed-assisted access (LAA), operator uses an unlicensed or non-exclusive wireless spectrum. In site sharing, multiple operators merely share the same site, and sometimes the same antenna. In distributed antenna systems (DAS), the same radio frequency (RF) antenna is shared by different operators. In neutral host networking services, a third party often deploys shared radio resources for an operator.

In additional examples of other technologies that differ from the techniques described herein, in multiple operator radio access network (MoRAN), RF/baseband operations are shared with independent service deployment. In multiple core network (MoCN), both the license and the radio resource management (RRM) operations are shared. In some aspects, multiple operators may be supported in a single subscriber identity module (SIM). An operator may provide services on a wireless local area network (WLAN) (e.g., Wi-Fi network) and can use a SIM for authentication to the network. Moreover, in an aspect, a Wi-Fi access point may advertise multiple service set identifiers (SSIDs) on one or more multiple carriers.

In an aspect, the various techniques described herein that involve an asset operator address some of the limitations of current operator configurations and/or of the other technologies described above. For example, the use of asset operators may address limitation in the dis-intermediation of assets (e.g., sites) that are currently part of a network operator's infrastructure. That is, assets are typically static in the short term and not dynamic between entities. For example, a same asset (e.g., small cell) is not currently made available to subscribers of different operators at different times, when not considering reallocation or disabling of resources within one operator. It is also currently difficult for a non-operator entity to become an operator without scale. It is also currently difficult for users (e.g., subscribers) to move from one operator to another operator without changing SIMs. The use of flexible, asset operator-based configurations may enable dynamic UE subscriptions that allow a subscriber to have a seamless experience as the move about or attend different events or venues. The techniques described herein may also allow for ad-hoc MVNO operations to be created for serving some roaming devices. In an example of the flexible operations that can be performed with configurations in which asset operators are available, groups of users can become a virtual operator and can change assets used by traditional operators based on cost, availability, and/or other features such as quality-of-service (QoS), for example, None of the other example technologies described above provides an efficient solution to enable flexible network access configurations or scenarios using different types of operators as described in the techniques of the present disclosure.

Currently, a network operator (referred to as a home network operator in relation to its subscribers) ordinarily provides network access to its subscribers (e.g., subscriber UEs) by communicating wirelessly with the subscriber over a defined wireless frequency spectrum, or simply wireless spectrum, owned by the network operator and using infrastructure, including various interconnected network devices, which is also owned by the network operator. This arrangement allows the network operator to provide prioritized (or exclusive) network access to its subscribers. That is, current network operators typically have a set or group of associated subscribers and also own the network resources or assets (e.g., the infrastructure and wireless spectrum) that are needed to provide network access to the subscribers. In addition, the infrastructure deployment of the network operator customarily defines a geographical footprint or coverage area of the network operator's wireless access. When a subscriber moves to a location outside of this geographical footprint, however, it is often forced to utilize the infrastructure and wireless spectrum owned by a different network operator with which the subscriber's home network operator has a roaming agreement in order to obtain WWAN access. Oftentimes, utilizing this visited network of the different network operator requires the subscriber to pay additional roaming fees. In addition, the transition to the visited network may require confirmation input from the user of the subscriber UE and the roaming agreement may decrease the quality-of-service (QoS) levels or bandwidth available to the subscriber UE, each of which may result in a degraded user experience for the roaming subscriber. In some instances, when a subscriber moves to a location outside the geographical footprint of the home network operator, there may not be another network to provide wireless wide area network (WWAN) access to the subscriber.

Not every entity or operator that provides services to subscribes, however, owns the wireless spectrum and/or network infrastructure over which the subscribers can obtain network access. For instance, unlike a traditional home network operator, an MVNO contracts with traditional network operators for the right to use the network operator's wireless spectrum and network infrastructure that may otherwise go unused. Therefore, MVNOs typically maintain a group of associated subscribers that are able to obtain network access through the wireless spectrum and infrastructure (e.g., site deployment) of other wireless network providers such as home network operators.

Although roaming and MVNO agreements allow subscribers of certain operators to obtain network access by using existing resources or assets owned or controlled by a traditional network operator, there are other potential configurations or arrangements for providing network access to subscribers when those subscribers are outside of the coverage area of their home network operator and/or when additional or alternative services can be provided to those subscribers through separate operators. Recognizing this need for more flexible arrangements, configurations, and/or business models, the present disclosure presents methods and apparatuses for providing network access using network devices (e.g., base stations, small cells) and/or wireless spectrum owned or controlled by asset operators that are not part of a traditional network operator and that do not have a set or group of subscribers.

These asset operators may have existing agreements or may dynamically establish agreements with other entities, such as traditional network operators or MVNOs, to allow subscribers of these entities to access their home network via the assets of the asset operators. These assets may include network infrastructure assets and/or network sites assets (sometimes referred to as infrastructure/sites assets or simply infrastructure/sites) or wireless spectrum assets (sometimes referred to as wireless frequency spectrum, frequency spectrum, wireless spectrum, or simply spectrum). Through these arrangements, any individual, company, MVNO, or traditional network operator could deploy one or more home-network-agnostic network entities that can provide wireless network access over its associated spectrum (e.g., licensed or unlicensed spectrum) for wireless devices (e.g., UEs) that may have a variety of corresponding operator subscriptions. Where a UE is granted network access through assets of an asset operator, a network device associated with the asset operator may provide a connection with which to enable communication data traffic with the home network of the UE using a core network (CN) of the home network operator.

The methods and apparatuses described herein may facilitate greater access to wireless technology, for instance, in geographical areas where traditional network operators have not established a service footprint. For instance, the aspects presented in the present disclosure could lead to companies to invest in capital in these geographical areas and could lease their infrastructure and/or wireless spectrum to one or more traditional operators for use by their subscribers or could even auction these available resources to the highest bidder.

The methods and apparatuses described herein may lead to new users of wireless technology and to new organizations or configurations of these technologies. For example, a single SIM may be used to dynamically support multiple operator assets. Asset operators may advertise which types of subscribers are supported by advertising or broadcasting multiple mobile country codes/mobile network codes (MCC/MNC) (e.g., public land mobile network (PLMN) identities). In addition, directed messaging may be used to indicate when and where home network accessibility may be available through assets of a different operator.

In a further use-case, multiple operators may partner to deploy infrastructure described in the present disclosure and could allow subscribers associated with any of these operators to access their corresponding home network through the deployed infrastructure. In such a scenario, operator-specific communication traffic may be routed to the corresponding home network, and in some instances, a unique processing core in one or more network devices deployed as part of the infrastructure may be used for realizing network access for each of the multiple partner operators.

For example, this approach may be followed by two traditional network operators. Rather than each operator deploying their own small cells (e.g., 3.5 GHz spectrum small cell deployment), these network operators may cooperate and deploy a set of common small cell that may be accessible by subscribers of both operators and obtain a higher return on investment (ROI). In this scenario, one or both network operators may operate as asset operators for a more efficient deployment. This approach may be an alternative to the neutral host networking described above. As described above, this type of deployment may work when the wireless spectrum is a licensed spectrum as well as for authorized shared access (ASA), which allows operators to access underutilized spectrum on a shared basis without interfering or affecting incumbent spectrum holders. In addition, this type of deployment may work with LTE over unlicensed or non-exclusive spectrum (e.g., LTE-U) or with licensed assisted access (LAA).

In addition, the network entity described herein could be deployed (temporarily or permanently) at locations that may have high traffic demands for relatively brief time periods, such as in stadiums, shopping malls, convention centers, transportation hubs, and other potentially high-traffic venues. Such an additional network outlay could provide standalone access for traditional network operators or may buttress existing network resources for these operators, allowing at least temporary access (or temporarily more robust access) for its subscribers.

Based on the techniques described herein, there may be different configurations or use-case scenarios in which different types of operators may be combined. For example, operations of an asset operator owning or controlling network infrastructure and wireless spectrum may be combined with those of an MVNO to provide network access to subscribers of the MVNO. In another example, operations of an asset operator owning or controlling network infrastructure and wireless spectrum may be combined with those of a network operator to provide network access to subscribers of the network operator. In yet another example, operations of an asset operator owning or controlling network infrastructure may be combined with those of a network operator to provide network access to subscribers of the network operator. In a further example, operations of two network operators may be combined such that subscribers of one network operator may obtain network access through network infrastructure and/or wireless spectrum of the other network operator.

FIGS. 1A-1E are diagrams illustrating examples of configurations or scenarios including different types of operators. For example, in FIG. 1A, there is shown a diagram 10 that illustrates different types of operators. A network operator 20 is shown that includes subscribers, network infrastructure (e.g., networking devices) and network sites (e.g., specific locations where the networking devices are deployed), and dedicated or available wireless frequency spectrum, referred to as wireless spectrum or simply spectrum. Also shown is an MVNO 30 that includes its own set of subscribers, and an asset operator 40 that may optionally include network infrastructure/sites (assets) and spectrum (assets). In one aspect, asset operator 40 may only include network infrastructure/sites, may only include spectrum, or may include both network infrastructure/sites and spectrum. In an aspect, the infrastructure of asset operator 40 may include one or more network devices such as network device 310 in FIGS. 3, 4A-4C, and 5. Moreover, the subscribers associated with either network operator 20 or MVNO 30 can refer to subscriber devices such as UE 104 shown in FIG. 6, for example.

Figure 1A:
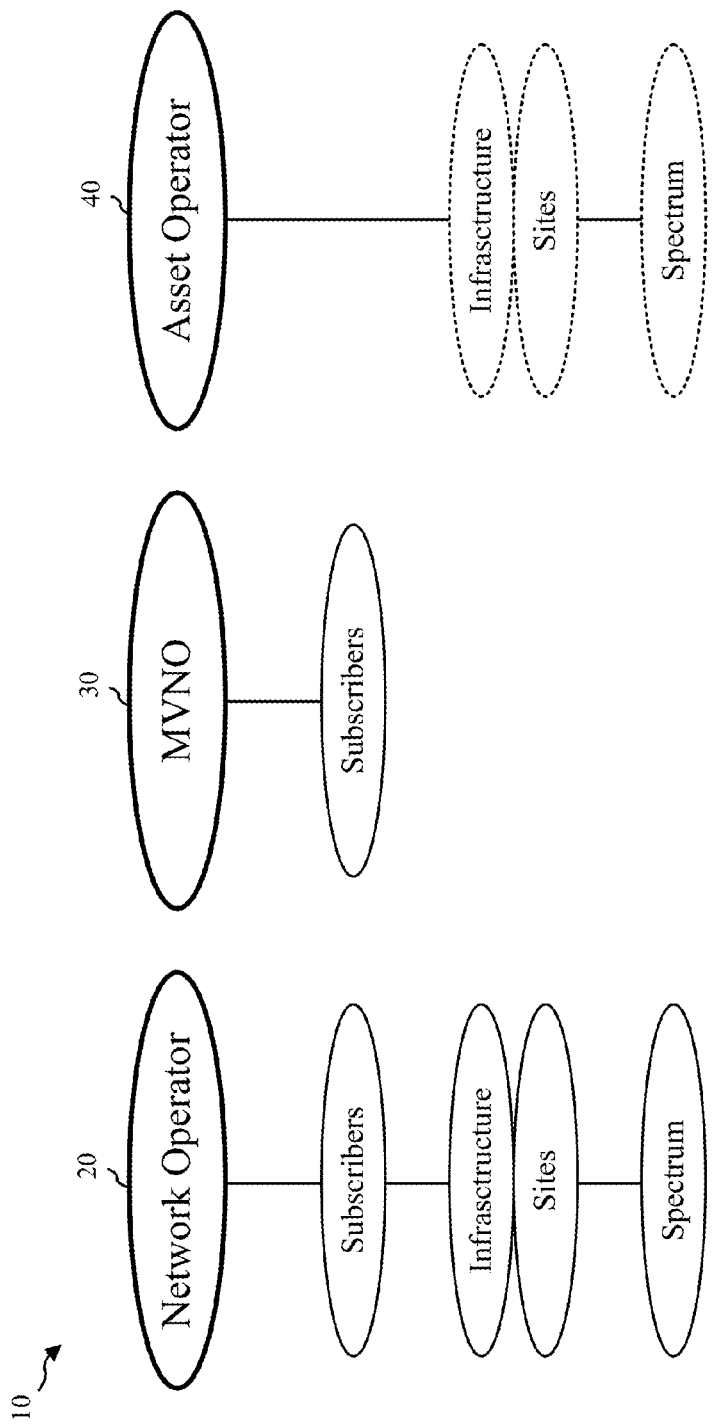
FIGS. 1A-1E are diagrams illustrating examples of configurations or scenarios including different types of operators.
Figure 1B:
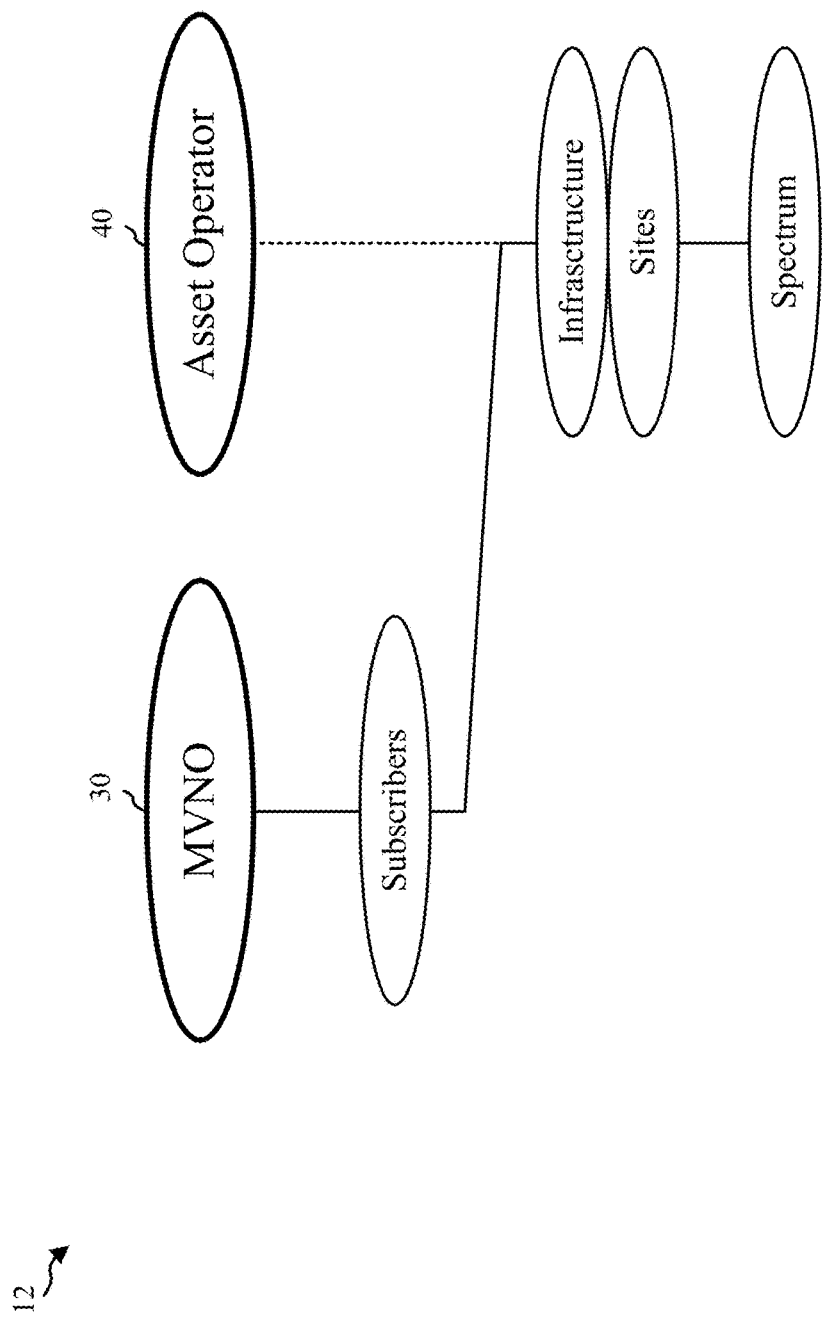

FIG. 1B illustrates a diagram 12 in which an example scenario, configuration, or arrangement is achieved between MVNO 30 and asset operator 40 via a pre-existing agreement or by a dynamic configuration or agreement as a result of, for example, an advertisement or an auction associated with infrastructure of asset operator 40. These agreements, as well as those described throughout this disclosure, may be referred to as services agreements or some other similar terminology. In this scenario, subscribers from MVNO 30 may gain or obtain access to their home network through network infrastructure/sites and spectrum provided by asset operator 40. The subscribers' home network may be associated with a network operator (not shown). In this example, the subscribers of MVNO 30 may gain or obtain WWAN access through asset operator 40 because of their presence in certain geographic areas, during certain times, or in connection with specified venues or events, where MVNO 30 may not provide WWAN access or may not provide such access with a desired level of connectivity for the subscribers.

Figure 1C:
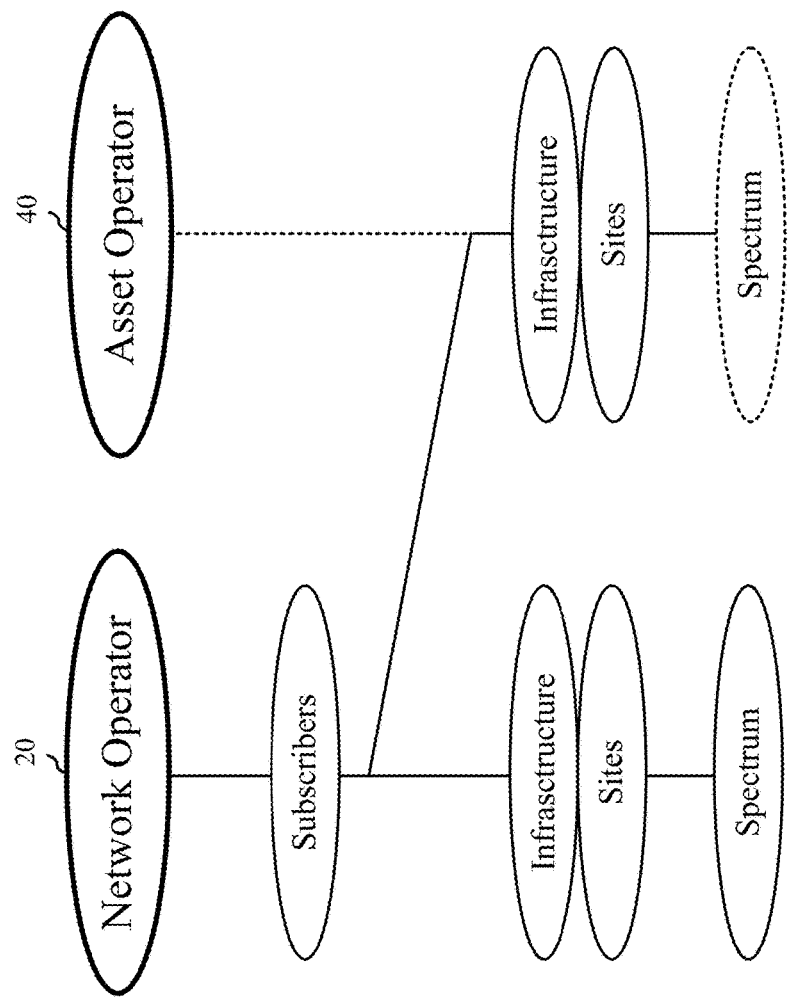

FIG. 1C illustrates a diagram 14 in which another example scenario, configuration, or arrangement is achieved between network operator 20 and asset operator 40 via a pre-existing agreement or by a dynamic configuration or agreement as a result of an advertisement or an auction. In this scenario, subscribers from network operator 20 may gain or obtain access to their home network through network infrastructure/sites provided by asset operator 40. In this example, the subscribers may gain or obtain WWAN access through asset operator 40 because of their presence in certain geographic areas, during certain times, or in connection with specified venues or events, where network operator 20 may not provide WWAN access or may not provide such access with a desired level of connectivity for its subscribers. Further to this example, asset operator 40 may optionally have its own spectrum to support WWAN access for the subscribers of network operator 20.

Figure 1D:
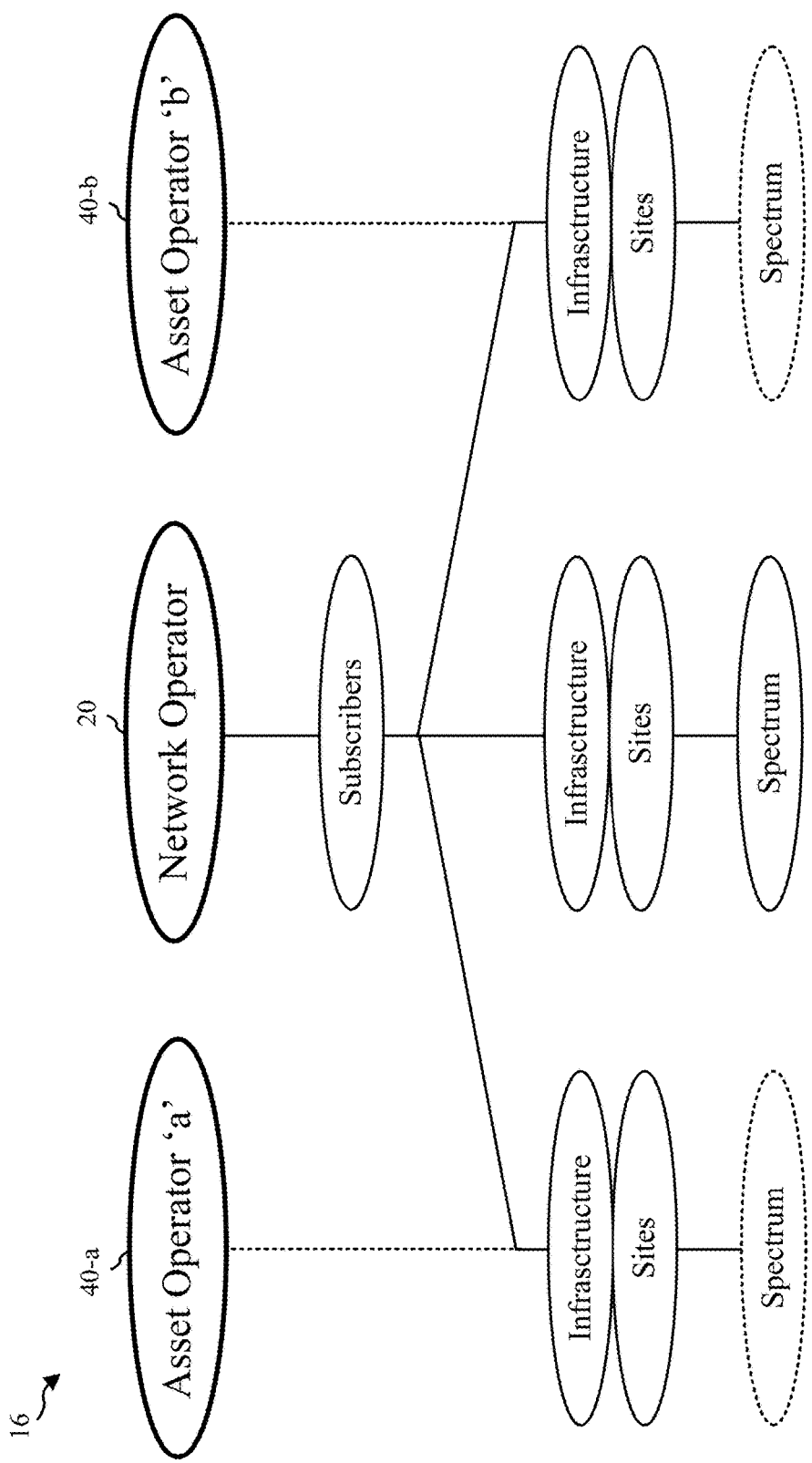

FIG. 1D illustrates a diagram 16 in which yet another example scenario, configuration, or arrangement is achieved between network operator 20 and an asset operator 'a' 40-*a* as well as an asset operator 'b' 40-*b* via a pre-existing agreement or by a dynamic configuration or agreement as a result of an advertisement or an auction. In this scenario, subscribers from network operator 20 may gain or obtain access to their home network through network infrastructure/sites provided by asset operator 'a' 40-*a* and/or through network infrastructure/sites provided by asset operator 'b' 40-*b*. In this example, the subscribers may gain or obtain WWAN access through asset operator 'a' 40-*a* because of their presence in certain geographic areas, during certain times, or in connection with specified venues or events, where network operator 20 may not provide WWAN access or may not provide such access with a desired level of connectivity for the subscribers, and where asset operator 'a' 40-*a* can provide a desirable level of WWAN access. Similarly, the subscribers may gain or obtain WWAN access through asset operator 'b' 40-*b* because of their presence in certain geographic areas, during certain times, or in connection with specified venues or events, where network operator 20 may not provide WWAN access or may not provide such access with a desired level of connectivity for the subscribers, and where asset operator 'b' 40-*b* can provide a desirable level of WWAN access. In an aspect, the geographic areas, times, or specified venues or events which the network infrastructure/sites of asset operator 'a' 40-*a* is configured to support WWAN access for subscribers of network operator 20 may be different from those which the network infrastructure/sites of asset operator 'b' 40-*a* is configured to support for those same subscribers, and such configurations may be the result of respective arrangements or agreements between network operator 20 and each of the asset operators. Further to this example, asset operator 'a' 40-*a* and asset operator 'b' 40-*b* may each optionally have its own spectrum to support WWAN access for the subscribers of network operator 20. In an aspect, the spectrum used by asset operator 'a' 40-*a* and/or asset operator 'b' 40-*b* may be an unlicensed or non-exclusive spectrum as is the case in certain WWAN-based technologies such as LTE-U.

Figure 1E:
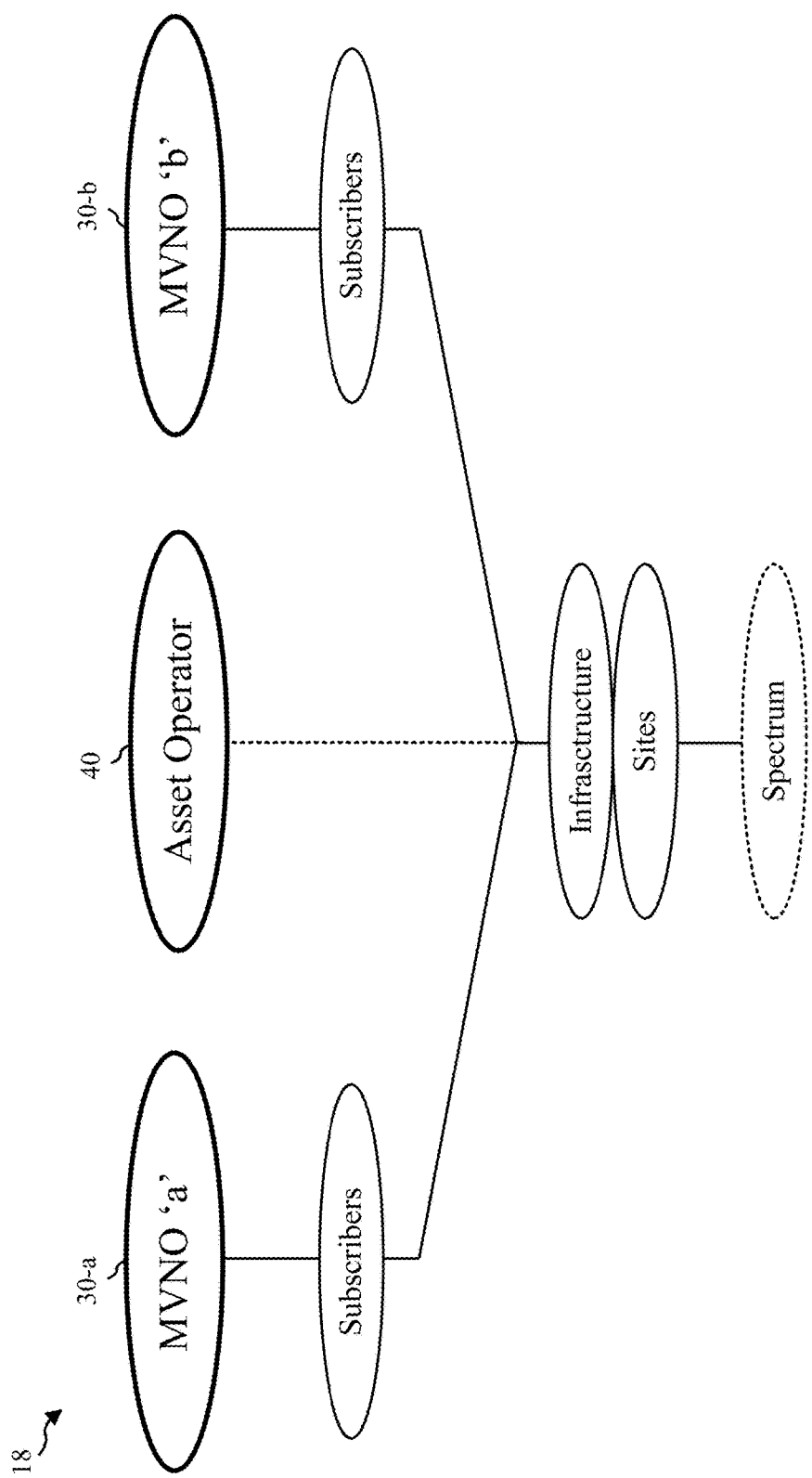

FIG. 1E illustrates a diagram 18 in which yet another example scenario, configuration, or arrangement is achieved between asset operator 40 and an MVNO 'a' 30-*a* as well as an MVNO 'b' 30-*b* via a pre-existing agreement or by a dynamic configuration or agreement as a result of an advertisement or an auction. In this scenario, subscribers from MVNO 'a' 30-*a* may gain or obtain access to their home network through network infrastructure/sites provided by asset operator 40. Similarly, subscribers from MVNO 'b' 30-*b* may gain or obtain access to their home network through network infrastructure/sites provided by asset operator 40. In this example, the subscribers from MVNO 'a' 30-*a* may gain or obtain WWAN access through asset operator 40-*a* because of their presence in certain geographic areas, during certain times, or in connection with specified venues or events where asset operator '40 can provide the WWAN access. Similarly, the subscribers from MVNO 'b' 30-*b* may gain or obtain WWAN access through asset operator 40 because of their presence in certain geographic areas, during certain times, or in connection with specified venues or events, where asset operator 40 can provide the WWAN access. In an aspect, the geographic areas, times, or specified venues or events which the network infrastructure/sites of asset operator 40 is configured to support for the subscribers of MVNO 'a' 30-*a* may be different from those which the infrastructure/sites of asset operator '40 is configured to support for the subscribers of MVNO 'b' 30-*b*, and such configurations may be the result of the respective arrangements or agreements between asset operator 40 and each of the MVNOs. Further to this example, asset operator 40 may optionally have its own spectrum to support WWAN access for the subscribers of the MVNOs. In an aspect, the spectrum used by asset operator 40 may be an unlicensed or non-exclusive spectrum as is the case in certain WWAN-based technologies such as LTE-U.

It is to be understood that the examples shown in FIGS. 1A-1E are provided by way of illustration and not of limitation. Other scenarios, configurations, or arrangements can be implemented using the techniques described herein in which multiple network operators, multiple MVNOs, and multiple asset operators may have or set up agreements to cooperate in manners that include the features or concepts described herein an illustrated, at least generally, in FIGS. 1A-1E. For example, aspects of the scenarios, configurations, or arrangements shown in FIGS. 1A-1E can be applied to the various scenarios described below in connection with FIGS. 2A, 2B, 3, and 4A-4C.

Figure 2A:
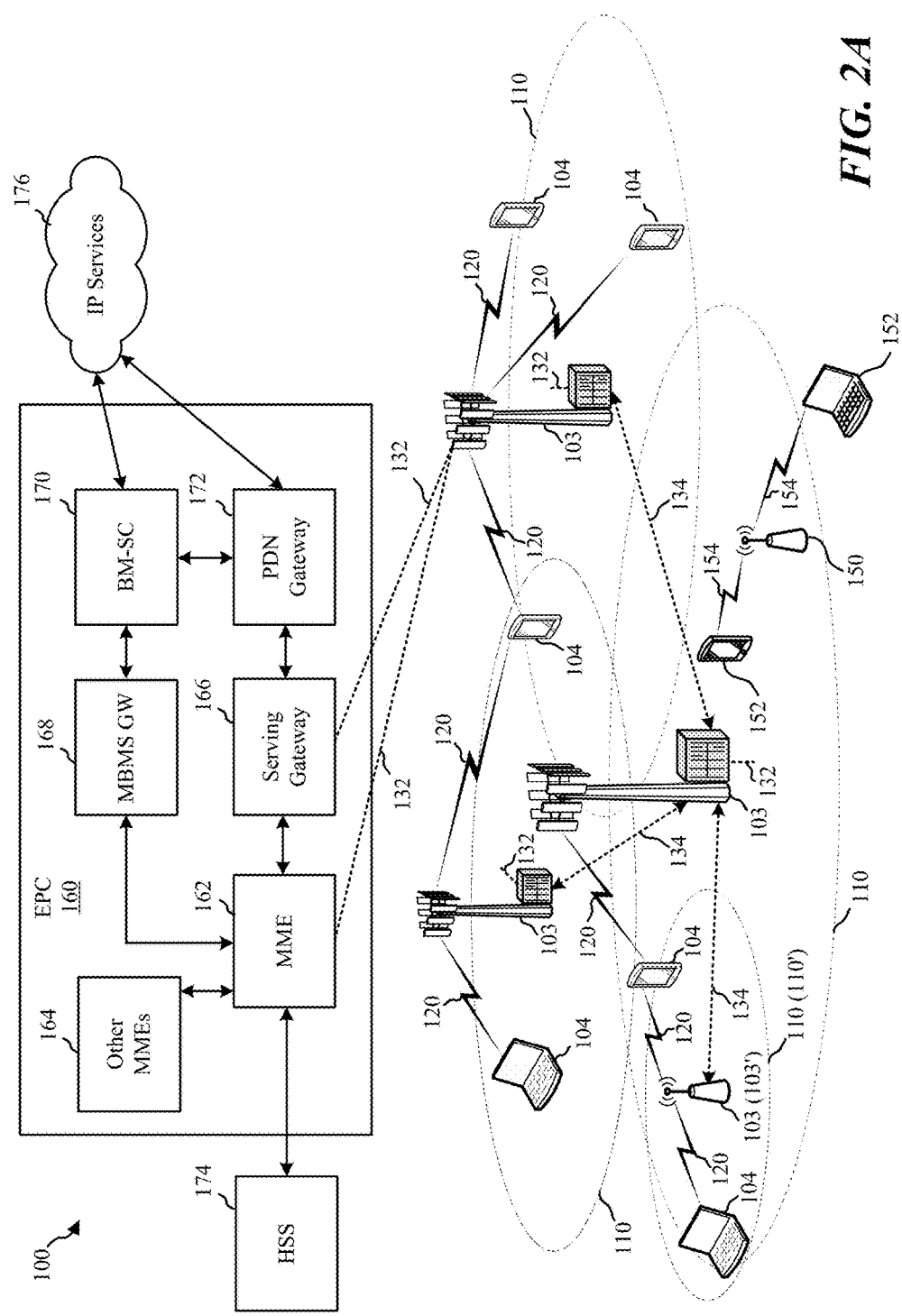
FIG. 2A is a diagram illustrating an example of a wireless communications system and access network.

FIG. 2A is a diagram illustrating an example of a wireless communications system and access network 100 in which multiple operators may participate in accordance with the various techniques described in this disclosure. For example, aspects of wireless communications system and access network 100 may be associated with at least a network operator (e.g., network operator 20 in FIGS. 1A, 1C, and 1D), an asset operator (e.g., asset operator 40 in FIGS. 1A-1E), or an MVNO (e.g., MVNO 30 in FIGS. 1A, 1B, and 1E). An asset operator may own or control, as part of its network infrastructure/sites, one or more network devices with which the asset operator can provide WWAN access to subscribers, such as user equipment (UEs) 104, of a network operator and/or of an MVNO. For example, one of the base stations 103 in FIG. 2A, base station 103' (e.g., a small cell or small cell base station), may be part of a deployment of network devices by an asset operator and may be configured to provide network access (e.g., WWAN access) to one or more UEs 104 that may have unique home network subscriptions. In an aspect, base station 103' may generally be a cellular access point that is configured to communicate with the one or more UEs 104 via over-the-air communication links 120 that each utilize a particular set of frequencies, which may be referred to herein as a frequency spectrum, wireless spectrum, or simply spectrum. Base station 103' may be configured to communicate with the one or more UEs 104 using a plurality of radio access technologies (RATs) and according to operator-specific communication protocols associated with each operator supported by base station 103'.

As illustrated in FIG. 2A, wireless communications system and access network 100 includes base stations 103 (including base stations 103'), UEs 104, and a core network (which also may be generally referred to herein as an evolved packet core or EPC) 160. In an aspect, base stations 103 in FIG. 2A may represent eNBs, NodeBs, or any other wireless network or access device associated with a traditional network operator or MVNO, whereas base stations 103' may be more specifically associated with an asset operator and configured to perform techniques described herein regarding providing network access for one or more UEs 104 that are subscribed to a network operator or an MVNO having some agreement or arrangement with the asset operator. Base stations 103 and 103' may provide communication coverage for a macro cell, a pico cell, a femto cell, and/or other types of cell. Small cells such as pico cells, femto cells, and/or other types of cells may be provided by small cell base stations as low power nodes or LPNs. A macro cell may generally cover a relatively large geographic area (e.g., several kilometers in radius) and may allow unrestricted access by UEs 104 with service subscriptions with the network provider or network operator. In an aspect, as used herein, the term "small cell" may refer to a base station or access point, or to a corresponding coverage area of the base station, where the base station in this case has a relatively low transmit power or relatively small coverage as compared to, for example, the transmit power or coverage area of a base station associated with a macro cell. In contrast to a macro cell, a small cell may cover a relatively small geographic area, such as, but not limited to, a home, a building, or a floor of a building. Therefore, the term "small cell," as used herein, refers to a relatively low transmit power and/or a relatively small coverage area cell as compared to a macro cell.

Base stations 103 (collectively referred to as Evolved Universal Mobile Telecommunications System (UMTS) Terrestrial Radio Access Network (E-UTRAN)) interface with an EPC 160 through backhaul links 132 (e.g., 51 interface). In addition to other functions, base stations 103 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. Base stations 103 may communicate directly or indirectly (e.g., through the EPC 160) with each other over backhaul links 134 (e.g., X2 interface). The backhaul links 134 may be wired or wireless.

Base stations 103 may wirelessly communicate with the UEs 104. Each of base stations 103 may provide communication coverage for a respective geographic coverage area 110. There may be overlapping geographic coverage areas 110. For example, base stations 103' may have a coverage area 110' that overlaps the coverage area 110 of one or more macro base stations 103. In some instances, however, the coverage areas do not overlap and subscribers of a network operator that would otherwise gain or obtain WWAN access through a base station 103 (e.g., macro cell or macro cell base station) may instead gain or obtain WWAN access through a base station 103' (e.g., small cell or small cell base station) of an asset operator while in the coverage area provided by base station 103'. A network that includes both small cell and macro cells may be known as a heterogeneous network. A heterogeneous network may also include Home Evolved Node Bs (eNBs) (HeNBs), which may provide service to a restricted group known as a closed subscriber group (CSG). Communication links 120 between base stations 103 and UEs 104 may include uplink (UL) (also referred to as reverse link) transmissions from a UE 104 to a base station 103 and/or downlink (DL) (also referred to as forward link) transmissions from a base station 103 or network entity 102 to a UE 104. Communication links 120 may use MIMO antenna technology, including spatial multiplexing, beamforming, and/or transmit diversity. Communication links 120 may be through one or more carriers. Base stations 103 and UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system and access network 100 may further include a wireless local area network (WLAN) access point, such as Wi-Fi access point (AP) 150 in communication with Wi-Fi stations (STAs) 152 via communication links 154 in a 5 GHz unlicensed, non-exclusive, or shared frequency or wireless spectrum. When communicating in an unlicensed frequency spectrum, STAs 152 and AP 150 may perform a clear channel assessment (CCA) prior to communicating in order to determine whether the channel is available.

In another aspect, when base station 103' is part of the network infrastructure/sites of an asset operator, base station 103' may be configured to provide WWAN access to UEs 104 using an unlicensed, non-exclusive, or shared wireless spectrum. For example, base station 103' may be configured to support LTE-U, LAA, MuLTEfire, or similar technologies in which WWAN-based communications are possible over unlicensed spectrum. When operating in an unlicensed spectrum, base station 103' and other network devices may use the same 5 GHz unlicensed spectrum used by the Wi-Fi AP 150. When deployed as part of a network operator, base station 103' employing an unlicensed spectrum may boost coverage to and/or increase capacity of the access network. When deployed as part of an asset operator, base station 103' employing an unlicensed spectrum may allow WWAN access to subscribers of a network operator in geographic areas, venues (e.g., shops, restaurants, stadiums), or at times where the network operator is not able to provide such network access.

EPC 160 may include, for example, a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between UEs 104 and EPC 160. Generally, MME 162 provides bearer and connection management. All user Internet protocol (IP) packets are transferred through Serving Gateway 166, which itself is connected to PDN Gateway 172. PDN Gateway 172 provides UE IP address allocation as well as other functions. PDN Gateway 172 and BM-SC 170 are connected to IP Services 176. IP Services 176 may include the Internet, an intranet, an IP Multimedia Subsystem (IMS), a PS Streaming Service (PSS), and/or other IP services. BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to base stations 103 belonging to a Multicast Broadcast Single Frequency Network (MBSFN) area broadcasting a particular service, and may be responsible for session management (start/stop) and for collecting eMBMS related charging information.

EPC 160 may correspond to the core network (CN) of a network operator associated with wireless communications system and access network 100. Accordingly, an asset operator may allow subscribers of the network operator to access their home network using EPC 160. By allowing such an approach, a subscriber need not pay additional fees as is the case in roaming operations.

In general, a base station 103 may also be referred to as a Node B, an access point, a base transceiver station, a radio base station, a radio transceiver, a transceiver function, a basic service set (BSS), an extended service set (ESS), a cell (e.g., macro cell or small cell), or some other suitable terminology. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. A UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2B:
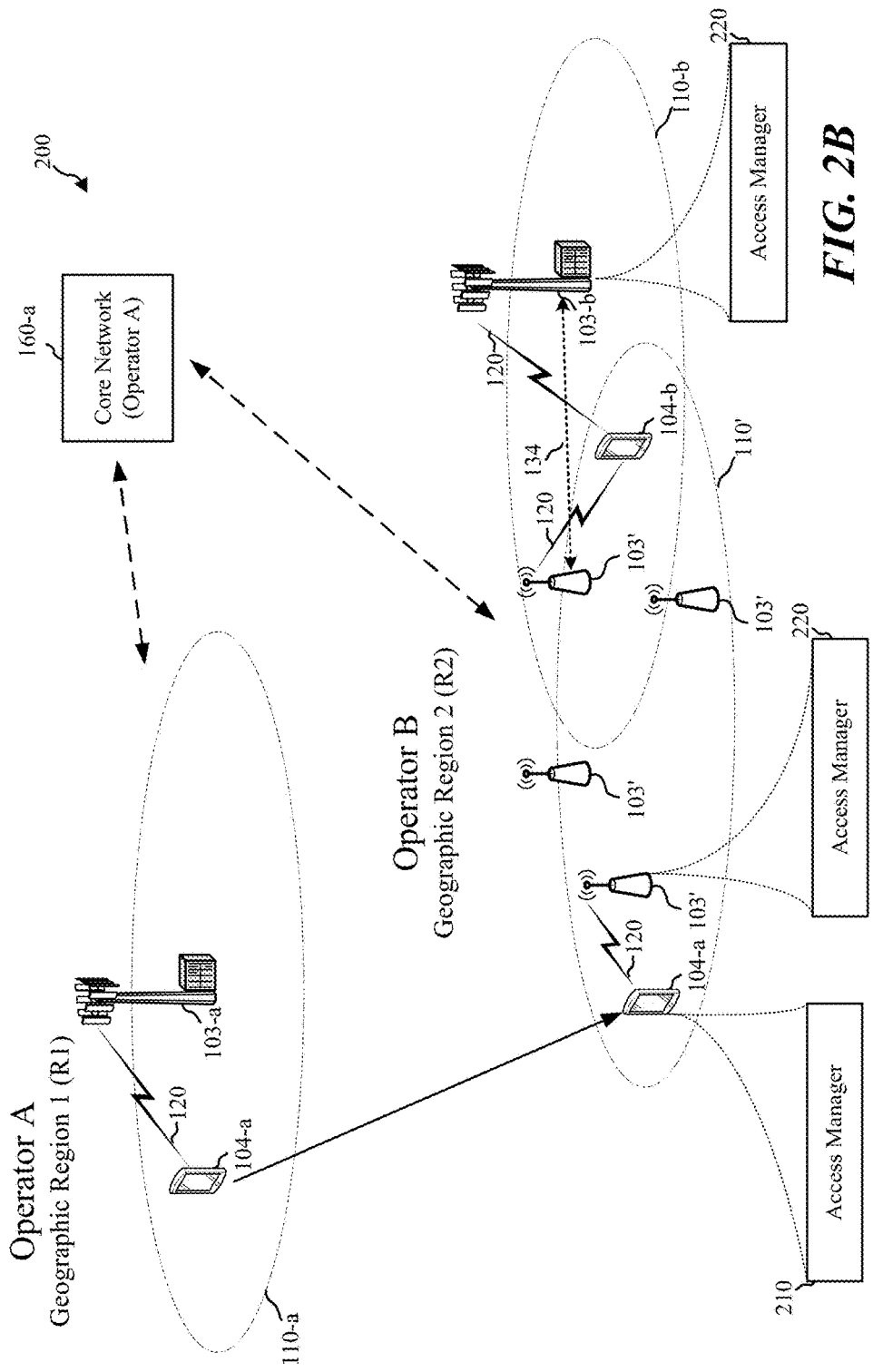
FIG. 2B is a diagram illustrating an example of a wireless communications system and access network implementation that supports multiple operators.

FIG. 2B shows a diagram 200 illustrating aspects of wireless communications system and access network 100 of FIG. 2A that support multiple operators in accordance with the techniques described in this disclosure. Various aspects of diagram 200 may be implemented or used in connection with diagrams 10, 12, 14, 16, and 18 in FIGS. 1A-1E, respectively, as described further below. The example shown in FIG. 2B corresponds to an implementation or scenario in which subscribers of an operator A can benefit from a small cell deployment of an operator B when, or in response to, operators A and B having an agreement allowing the operators to share the small cell platform for processing, storage, and/or data traffic communication. In an aspect, subscribers of operator B, as well as those of operator A accessing their core network through operator B, can use operator B spectrum. Operator B may also provide access through another (e)NodeB (e.g., macro cell). In some instances, it may be advantageous to gain or obtain WWAN access through a base station of another operator because such base station (e.g., a "macro" (e)NodeB) can provide better access (e.g., higher data rate) that the subscribers' own operator's network.

Returning to FIG. 2B, there is shown on the upper left corner of diagram 200, a coverage area 110-a of a first operator (Operator A). A base station 103-a provides WWAN access (e.g., cellular access) to UE 104-a, which in turn communicates with base station 103-a via communications links 120. Coverage area 110-a is associated with a particular geographic region (e.g., geographic region 1 or R1) of Operator A. Data and/or other traffic of UE 104-a may go through core network (CN) 160-a associated with Operator A.

In this example, UE 104-a may move or travel to another geographic region (e.g., geographic region 2 or R2) where Operator A does not provide coverage, but a second operator (Operator B) provides coverage through a deployment of base stations 103' (with coverage area 110') and/or a deployment including a base station 103-b (with coverage area 110-b) (see e.g., lower portion of diagram 200). UE 104-a may gain or obtain WWAN access to CN 160-a associated with Operator A through Operator B, which in this example may be an asset operator (e.g., asset operator 40 in FIGS. 1A-1E) and may own or control one or both of network infrastructure/sites assets (e.g., one or more network devices such as base stations 103' and 103-b) or wireless spectrum assets (e.g., one or more specified wireless frequency bands (e.g., licensed and/or unlicensed spectrum)).

Further to this example, UE 104-a may include an access manager 210 that is configured to enable UE 104-a to communicate via any one of multiple operators (e.g., approved operators such as approved asset operators) with CN 160-a of the home network operator to which UE 104-a is subscribed (i.e., Operator A). Also shown is that base stations 103' in the deployment having coverage 110' (as well as base station 103-b in the deployment having coverage 110-b) can include an access manager 220 that is configured to enable the base station to provide UE 104-a with access to its subscribed home network via CN 160-a. As shown in FIG. 2B, a UE 104-b, which may be a different subscriber from Operator A, may gain access to its home network (e.g., CN 160-a) via a base station 103' in coverage area 110' or via base station 103-b (e.g., a macro cell base station) in coverage area 110-b.

The implementation or scenario described in connection with FIG. 2B may occur in instances in which Operator A has a big presence in geographic region 1 (R1) and many of its subscribers mover or travel to geographic region 2 (R2)

for business, leisure, or medical reasons, for example, and Operator A has not footprint in R2. Because of this type of subscriber movement, Operator A may find it useful to operate as an MVNO in R2 and set up agreements with Operator B where Operator A is an MVNO and Operator B is an asset operator. With such an agreement, network devices that are part of the network infrastructure/sites of Operator B's deployment can be configured to recognize Operator A subscribers as subscribers of an approved MVNO operator. This type of arrangement could be temporary, for example, during peak vacation times or business travel periods. Operator A may tie up in this manner with Operator B and, as such, Operator B's network devices may only recognize Operator A subscribers as subscribers of an approved MVNO operator during specified periods of time. This is completely transparent to Operator A subscribers who can access their home network easily in R2 without knowledge of the cooperation taking place between operators.

The implementation or scenario described in connection with FIG. 2B, and with aspects of FIGS. 1A-1B, may also be beneficial to operators in venues like stadiums, shopping malls, enterprises, and the like. This arrangement opens up the opportunity for third parties (e.g., asset operators) to deploy networks or portions of a network in specific locations (e.g., sites) and accessible during specific times (e.g., during certain events, at peak data traffic hours, at low data traffic hours). Some of the benefits include having an operator (e.g., a home network operator) lower capital outlay or expenses and/or possibly reducing operating expenses. Also, there may be related scenarios in which a single operator may not have a large enough subscription of user to build out a network and multiple operators may have enough user (subscribers) to partner with an asset operator who can then justify the capital expense of deploying its own network infrastructure. In other related scenarios, a real estate developer, corporate enterprise, or government agency may want to build out its own network infrastructure so that potential customers know that leasing or buying property from these entities will ensure having access and throughput, particularly in remote or less accessible areas or in areas where wireless access is limited because of large number of users/subscribers in those areas. In yet other related scenarios, Internet-of-Things (IoT) users may benefit from having asset operators, particularly in greenfield environments. In another aspect related to the implementation or scenario described in FIG. 2B, certain operators may not find it cost-effective to fully populate or provision their network for a specific event, but an asset operator may have a more efficient operation and may be able to deploy network infrastructure for that event and lease the network infrastructure to other operators in a mutually beneficial manner.

The implementation or scenario described in connection with FIG. 2B, and with aspects of FIGS. 1A-1B, may also be beneficial to IoT vendor operations across multiple boundaries. For example, an IoT vendor may become an MVNO for its deployed devices and network infrastructure. Moreover, during no/low usage, the IoT vendor may become an asset operator and provide access through its network infrastructure. In this scenario, the network devices may be configured to advertise its operations as those of an asset operator only during no/low usage periods when the IoT vendor does not need to have access to its network infrastructure to obtain data (e.g., readings, measurements) and/or configure its deployed devices (e.g., sensors, readers). In general, it is possible for the use of the network infrastructure and/or wireless spectrum owned or controlled by the IoT vendor to operate in different configurations (e.g., MVNO, asset operator) over time.

The implementation or scenario described in connection with FIG. 2B, and with aspects of FIGS. 1A-1B, may also be beneficial in cases where a small cell of an asset operator can be configured to transmit temporary information depending on the request of the operator (e.g., network operator or MVNO). For example, a small cell may be controlled by an asset operator or some other third party but may not be pre-aligned with any one specific network operator or MVNO. In an aspect, the small cell may have its own spectrum or use unlicensed spectrum (e.g., LTE-U). The temporary information transmitted by the small cell allows operators to establish, even if just for a short period of time, a relationship (e.g., agreement) with the small cell. Multiple operators can do the same, whereby it is possible for different operators (e.g., MVNOs) to play operators off each other. The flexibility permitted by the broadcasting or advertising performed by the small cell allows non-traditional operators (e.g., owner of a chain of restaurants or coffee shops) to offer services and have a better relationship with its customers. Moreover, it is possible to change operators over time without affecting services, SIMs, etc.

The implementation or scenario described in connection with FIG. 2B, and with aspects of FIGS. 1A-1B, may also be beneficial to retail stores, utility companies, delivery services, car manufacturers, and again to IoT vendors that have a large footprint (e.g., large regional or national coverage). Such entities may prefer to be an MVNO and rely on multiple asset operators instead of network operators for network access. These entities can operate as MVNOs only during times where it is more cost effective to do so. For example, a utility company may lease network infrastructure and/or spectrum from an asset operator during non-peak hours to collect reader information. Moreover, these entities can use different asset operators or third party equipment in different markets, sometimes down to specific cell sites if that level of granularity is available from the asset operator or third party.

It is to be understood from the scenarios, configurations, or arrangements described above in connection with FIGS. 1A-1E and 2B that an asset operator's network infrastructure assets and/or wireless spectrum assets provide significant flexibility. As such, network devices deployed as part of an asset operator's network infrastructure can be configured to interact with different subscribers from different operators and enable those subscribers to communicate with their respective home networks in a manner is that transparent or seamless to the subscribers.

FIG. 3 shows a diagram 300 illustrating an example of a network device 310 that supports traffic for multiple operators. Network device 310 may correspond to a base station or access point, such as base station 103' in FIGS. 2A and 2B, that is own or controlled by an entity that is either an asset operator 40 or provides the services of an asset operator 40 (e.g., a network operator serving at least temporarily as an asset operator). Accordingly, network devices 310 and base stations 103' refer to similar types of network infrastructure assets that are part of a deployment by an asset operator.

As shown in FIG. 3, network device 310 may provide access to different subscribers in the form of different UEs. In this case, UE 104-a is a subscriber of Operator 'a' 50-a, UE 104-b is a subscriber of Operator 'b' 50-b, and UE 104-N is a subscriber of Operator 'N' 50-c. Each of operators 'a', 'b', and 'N' can be either a network operator or an MVNO. To handle multiple operators being supported at the same time, network device 310 may include a processing system 320 in which one or more processors (see e.g., processor(s) 530 in FIG. 5) can be used as part of processing system 320. Within processing system 320, each of operators 'a', 'b', and 'N' has assigned a separate processing core to handle all processing related to communications and/or traffic associated with that operator, including routing communications and/or traffic to a core network of the operator. In this example, a core 'a' 322 handles operations for operator 'a', a core 'b' 324 handles operations for operator 'b', and a core 'N' 326 handles operations for operator 'N'. Managing these cores is a hypervisor 330, which controls the partitioning between the different operator domains (e.g., cores) in processing system 320. More generally, a hypervisor refers to as a virtual machine manager, and is a program that allows multiple operating systems (e.g., cores) to share a hardware host (e.g., one or more processors, memory), where each operating system may appear to have its own processor, memory, and other resources.

Figure 4A:
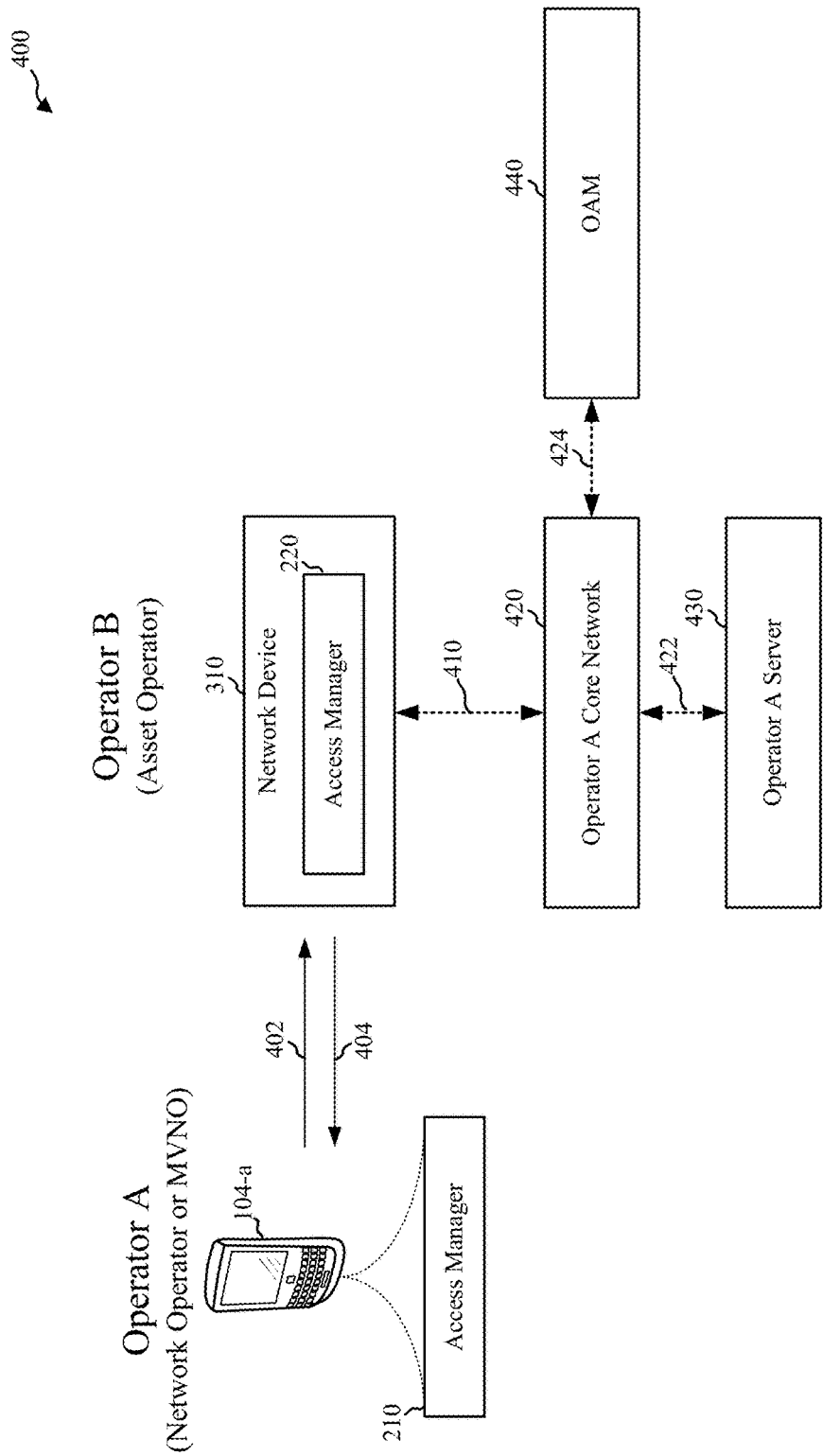
FIG. 4A is a diagram illustrating an example scenario in which a network device advertises network access.

FIG. 4A shows a diagram 400 illustrating an example scenario in which a network device advertises network access. One of the differences between other technologies and the techniques described herein is that other technologies are not able to provide the flexibility that is possible with the type of asset operator arrangements presented in this disclosure. One such flexibility is the ability of a network device (e.g., network device 310 in FIG. 3) to advertise (e.g., provide indications or information about) access or operator types, venue information, availability information, and similar details that allow a subscriber device (e.g., UE 104) to identify network infrastructure through which it can gain or obtain WWAN access to its home network. For example, small cells owned by entities other than the network operators themselves can be configured to provide broadcasting or advertisement of the features and/or operators that they support for WWAN access.

Returning to FIG. 4A, there is shown a UE 104-*a* having access manager 210 (FIGS. 2B and 6) and subscribed to Operator A, which may be a network operator (e.g., network operator 20 in FIGS. 1A, 1C, and 1D) or an MVNO (e.g., MVNO 30 in FIGS. 1A, 1B, and 1E). Also shown is network device 310 having access manager 220 (FIGS. 2B and 5) and associated with Operator B, an asset operator (e.g., asset operator 40 in FIGS. 1A-1E). UE 104-*a* may send messages, requests, packets, and/or any type of information to network device 310 via signals 402 (e.g., uplink or UL signals), while network device 310 may send messages, responses, packets, and/or any type of information to UE 104-*a* via signals 404 (e.g., downlink or DL signals). Network device 310 is configured to provide UE 104-*a* WWAN access to its home network, that is, through network device 310, UE 104-*a* can have data and/or other type of traffic with Operator A core network 420.

In the example shown in FIG. 4A, link 410 between network device 310 and Operator A core network 420 is merely representative of the communication and/or traffic between these two network entities and it is not meant to indicate a direct connection between these two network entities.

Moreover, Operator A core network 420 may communicate with an Operator A server 430 via a link 422, which like link 410, need not indicate a direct connection between Operator A core network 420 and Operator A server 430. While shown separate from Operator A core network 420, Operator A server 430 is part of Operator A's network and can be part of Operator A core network 420 or any of a core network's components (see e.g., FIG. 2A, EPC 160). Similarly, Operator A core network 420 may communicate with operations, administration, and management (OAM) 440 that manages the operations of Operator A's network.

In one example of the operation described in FIG. 4A, Operator B may configure network device 310 (e.g., a small cell) to advertise MVNO support capabilities, where Operator A is an MVNO. Network device 310 may advertise or broadcast these capabilities through signals 404. In this regard, network device 310 may use a generic advertisement service (GAS) to advertise MVNO support capabilities. In response to the advertisement, UE 104-*a* may send a query (e.g., via signals 402) to network device 310 about the MVNO support capabilities. Network device 310 may forward or relay the query, or information about the query, to Operator A server 430 via Operator A core network 420. Network device 310 may then deliver a response, or information about the response, from Operator A server 430 to UE 104-*a*. As part of this process, OAM 440 may configure MVNO traffic policies into Operator A core network 420. Once the MVNO traffic policies are in place, and in response to the server information provided by network device 310, UE 104-*a* can establish a connection (e.g., via signals 402 and 404) with network device 310 for network device 310 to provide WWAN access to UE 104-*a* to its home network (e.g., home network of Operator A).

Figure 4B:
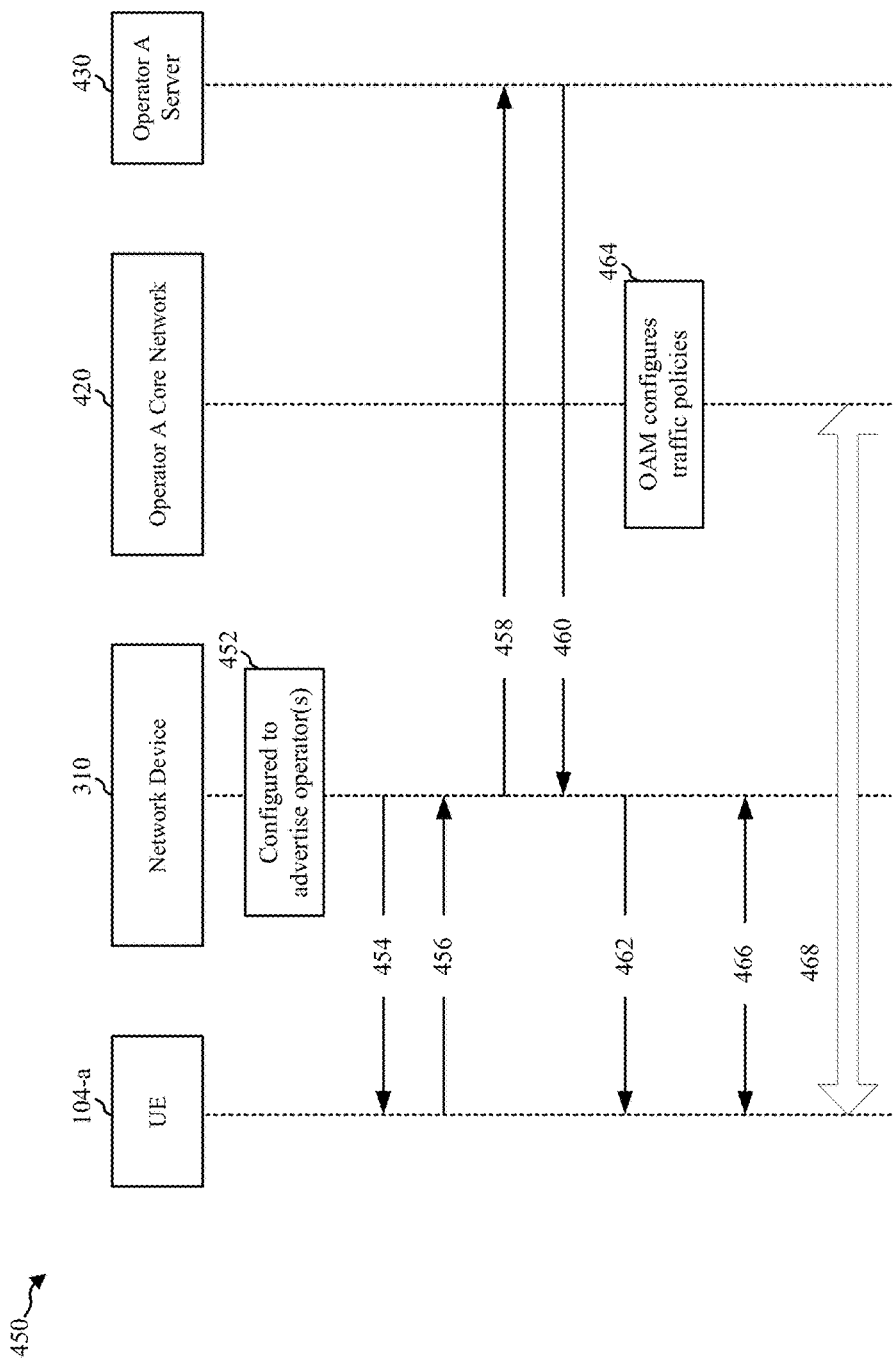
FIG. 4B is a call flow diagram illustrating an example of network access advertisement.

FIG. 4B shows a call flow diagram 450 illustrating the network access advertisement described above with respect to FIG. 4A. At 452, Operator B configures network device 310 to advertise MVNO support capabilities. At 454, network device 310 broadcasts, transmits, or otherwise advertises, through messages or the like, that it is capable of supporting MVNO subscribers in its coverage area. UE 104-*a*, and perhaps other UEs as well, receives the advertised information. At 456, in response to receiving the advertised information, UE 104-*a* sends a query to network device 310, which in turn at 458 forwards the query, or information about the query, to Operator A server 430. At 460, Operator A server 430 responds to the query and provides the response to network device 310, which in turn at 462 forwards or relays the response, or information about the response, to UE 104-*a*. At 464, OAM 440 configures MVNO traffic policies in Operator A core network 420 to enable MVNO operation by Operator A using network infrastructure and/or wireless spectrum on Operator B. At 466, UE 104-*a* establishes a connection with network device 310 that allows UE 104-*a* to communicate with Operator A core network 420 through network device 310, as shown in 468.

Figure 4C:
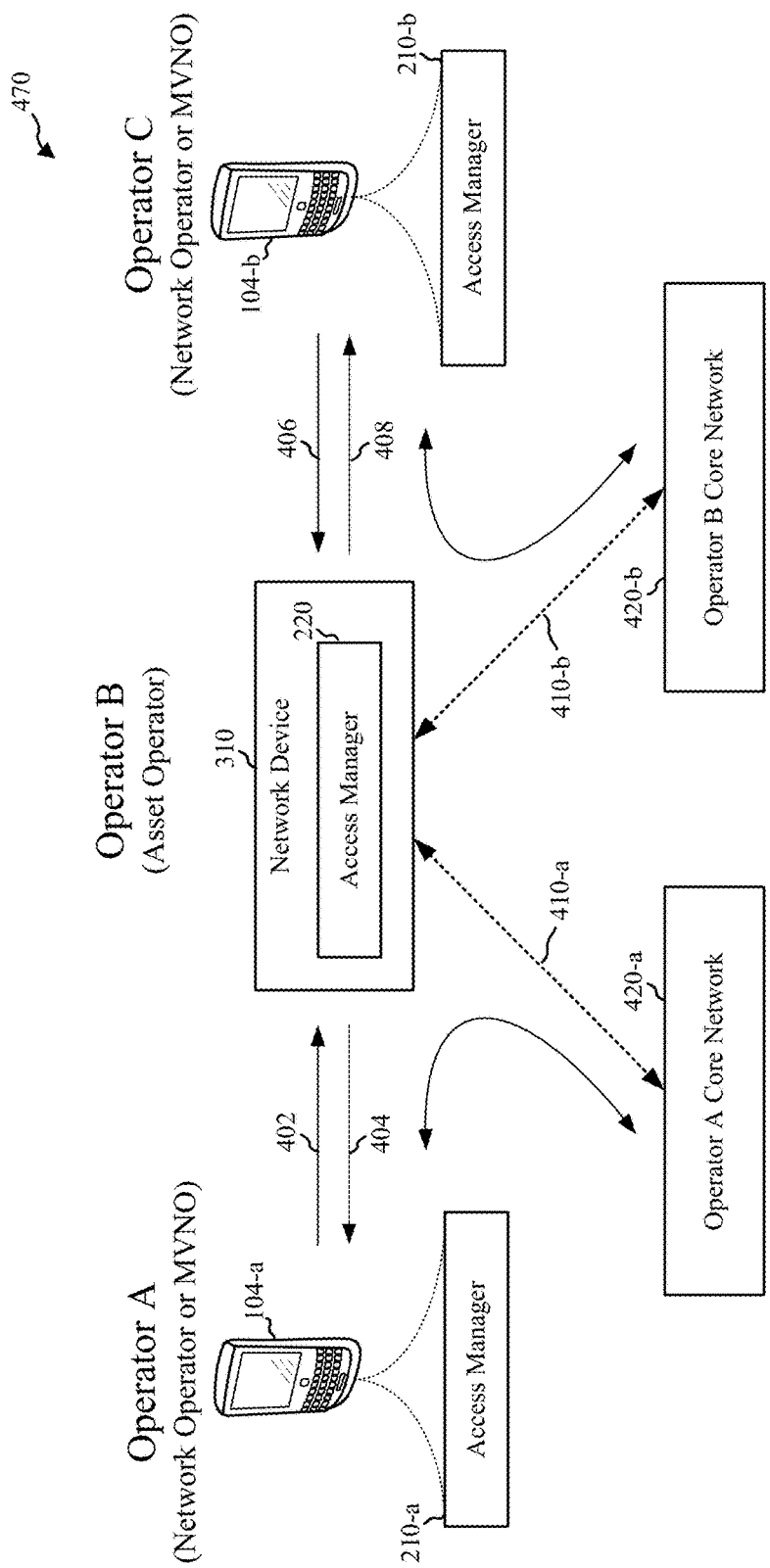
FIG. 4C is a diagram illustrating an example scenario in which a network device advertises network access to multiple operators.

FIG. 4C shows a diagram 470 illustrating an example scenario in which network device 310 having access manager 220 advertises network access to multiple operators. In this example, UE 104-*a*, having access manager 210-*a*, is subscribed to Operator A and accesses Operator A core network 420-*a* through network device 310 and link 410-*a*. Access manager 210-*a* may be an example of access manager 210 described in more detail in FIG. 6. As noted above, Operator A may be a network operator or an MVNO. Network device 310 advertises its asset operator (Operator B) services to UE 104-*a* through messages sent via signals 404 and UE 104-*a* sends queries via signals 404 to initiate the process of establishing a connection with network device 310 to gain or obtain WWAN access to Operator A core network 420-*a*.

Similarly, UE 104-*b*, having access manager 210-*b*, is subscribed to Operator C and accesses Operator C core network 420-*b* through network device 310 and link 410-*b*. Access manager 210-*b* may be another example of access manager 210 described in more detail in FIG. 6. Network device 310 advertises its asset operator (Operator B) services to UE 104-*b* through messages sent via signals 408 and UE 104-*b* sends queries via signals 406 to initiate the process of establishing a connection with network device 310 to gain or obtain WWAN access to Operator C core network 420-*b*.

Because agreements between Operator A and Operator B, and between Operator C and Operator B, may be different, the asset operator services advertised by network device 310 to a subscriber of Operator A (e.g., UE 104-*a*) may be different from the asset operator services advertised by network device 310 to a subscriber of Operator C (e.g., UE 104-*b*). The difference in asset operator services may involve different data rates, times of service, events supported, and the like.

When advertising asset operator capabilities, network device 310 may provide the information being advertised in a field (or multiple fields) in a master information block (MIB) and/or in a system information block (SIB). Such field may be an existing field or may be a new field configured to carry the advertised or broadcast information. In an aspect, the MIB/SIB field may advertise an additional public land mobile network (PLMN) identity (e.g., mobile country codes/mobile network codes (MCC/MNC)) of an operator supported by network device 310. In another aspect, the MIB/SIB field can advertise other PLMN identity, can indicate that there are one or more other PLMN identities identified in another SIB, can have a query of whether a particular operator (e.g., PLMN identity) is supported, can advertise that a certain PLMN identity is valid or invalid, can advertise that a certain PLMN identity will be valid at a later time (and indicate for how long it will be valid), or a combination of these. The MIB/SIB field can use indicators that group multiple possible PLMN identities into fewer bits.

Other aspects that can be advertised in, for example, an MIB/SIB field, are classes associate with PLMN identities. For example, network device 310 may advertise whether users or subscribers of a particular operator (e.g., a particular PLMN identity) will be secondary users in network device 310, where secondary users may have a lower priority in certain metrics such as data rates compared to primary users or users having a higher priority. In another example, network device 310 may advertise that users or subscribers of a particular operator will get certain QoS level in network device 310, where users or subscribers of another operator may get a different QoS level in network device 310. In one aspect, network device 310 may, as part of its advertisement, or in response to a query from a subscriber, indicate (e.g., using a metric or some other parameter) to a subscriber whether to use or not network device 310 to gain or obtain WWAN access to the subscriber's home network.

Other aspects that can be advertised in, for example, an MIB/SIB field, are aggregators of PLMN identities. For example, network device 310 may advertise or send a message to subscribers of PLMN identity A that they can use instead PLMN identity B until otherwise indicated, for a certain period of time, or during certain events.

In addition to the aspects described above, an asset operator (e.g., asset operator 40) can be configured to handle auctions and reverse auctions of assets or resources (e.g., network infrastructure and/or wireless spectrum). For example, in an environment in which an asset operator is being used, a user or subscriber (e.g., UE 104) may be associated with an MVNO that may shop its subscribers to operators and others who may have assets available to serve the MVNO subscribers. An auction or bidding mechanism between the operator (e.g., a network operator or an MVNON) and an asset operator can be instituted to facilitate the exchange and can be performed in advance or in real time.

In an aspect of the auction or bidding mechanisms supported, an MVNO may identify its geographic and/or temporal requirements and may coordinate with one or more asset operators to get the needed resources or assets that will ensure the appropriate coverage for its subscribers. In this regard, it is possible for an asset operator to advertise through network devices (e.g., network device 310) the asset operator's capabilities, and have a subscriber of the MVNO receive the information and pass that information to an administrative operation of the MVNO, which in turn coordinates with the asset operator to establish an agreement between the MVNO and the asset operator.

In another aspect of the auction or bidding mechanisms supported, an MVNO can segregate its resources (e.g., asset operators) to users that need the resources the most, For example, if an MVNO has resources of different types (e.g., asset operators that provide lower cost, asset operators that provide higher data rates), it can tag each of these resources via a broadcast message, a direct message, or data stored previously in subscribers' memory, so that the MVNO subscribers know which resource (e.g., asset operator) to utilize. That is, a UE 104 subscribed to a particular MVNO may be configured to select an asset operator (e.g., resource) between multiple asset operators approved by the MVNO based at least in part on the type of the asset operators that are available to the UE 104. Moreover, a UE 104 subscribed to a particular MVNO may be configured to select an asset operator (e.g., resource) between multiple asset operators approved by the MVNO based at least in part on which of the asset operators that are available to the UE 104 meet QoS requirements.

FIG. 5 shows a block diagram 500 illustrating an example of network device 310 for an asset operator. Network device 310 can be a small cell base station or a macro cell base station, for example, and can be part of a small cell base station deployment or a macro cell base station deployment of the asset operator. Moreover, network device 310 can support multiple radio access technologies (RATs), and may use RATs based on licensed and/or unlicensed spectrum to provide WWAN access to subscribers of one or more network operators or MVNOs.

Network device 310 may be configured to receive a request for WWAN access for a UE (e.g., UE 104-*a* in FIGS. 2B, 3, and 4A-4C). In an aspect, the request may be based on information received by the UE from the operator, where the information indicates one or more of geographic, temporal, or quality-of-service requirements by the UE for WWAN access through network device 310. The network device 310 may be configured to identify the UE as a subscriber of an operator based at least in part on the request, where the operator is different from the asset operator, and where network device 310 is configured to provide WWAN access to subscribers of the operator via a core network associated with the operator (see e.g., FIGS. 2B and 4A-4C) based at least in part on a services agreement between the operator and the asset operator. Network device 310 may be configured to provide WWAN access to the UE in response to identifying that the UE is a subscriber of the operator. Network device 310 may be configured to provide WWAN access via licensed wireless spectrum assets, or unlicensed or shared wireless spectrum assets. As described above, the operator may be an MVNO (e.g., MVNO 30 in FIGS. 1A, 1B, and 1E) and the asset operator provides access to one or both of network infrastructure or wireless spectrum assets to subscribers of the MVNO, where the network infrastructure includes network device 310, or the operator may be a home network operator (e.g., network operator 20 in FIGS. 1A, 1C, and 1D) and the asset operator provides access to one or both of network infrastructure or wireless spectrum assets to subscribers of the home network operator, where the network infrastructure includes network device 310.

In an aspect, network device 310 may be configured to identify the UE as a subscriber of the operator by identifying the UE as a subscriber of one of multiple approved operators including the operator, where network device 310 may be further configured to provide WWAN access to subscribers of each approved operator via a core network of the respective approved operator based at least in part on a services agreement between the approved operator and the asset operator.

In another aspect, network device 310 may be configured to, for each of the multiple approved operators, configure a separate processing core (see e.g., cores 'a', 'b', and 'N' in FIG. 3) to handle WWAN traffic operations, and manage each separate processing core via a hypervisor (e.g., hypervisor 330) operating on network device 310.

In yet another aspect, network device 310 may be configured to broadcast or advertise a message indicating one or more approved operators supported by the network device, including the operator. The request for WWAN access for the UE received by network device 310 may be received from the UE in response to the message. The message may specify, among various things, a time during which WWAN access is available via network device 310 to subscribers of each of the one or more approved operators.

In another aspect, network device 310 may be configured to broadcast that the operator is supported by network device 310, and to communicate information about the request for WWAN access for the UE to a server (e.g., Operator A server 430 in FIG. 4A) of the operator, where the request is received at least in part in response to the broadcasting. Network device 310 may be further configured to communicate information received from the server to the UE to establish a connection between network device 310 and the UE, and to establish the connection to provide WWAN access to the UE.

In another aspect, network device 310 may be configured to broadcast or advertise in one or more fields in an MIB, an SIB, or in both, an indication of a PLMN identity associated with the operator, where the request for WWAN access for the UE may be received at least in part on the broadcasting or advertising. For example, network device 310 may be configured to broadcast or advertise in one or more fields in one or more MIBs or SIBSs at least one of: an indication of a PLMN identity associated with the operator, an indication of multiple PLMN identities associated with the operator, an indication to the UE to query whether the operator to which the UE subscribes is supported by network device 310, an indication that a PLMN identity will be supported at a later time by network device 310, or an indication of different service levels or class types for a PLMN identity associated with the operator.

In accordance with the present disclosure, network device 310 may include a memory 535, one or more processors 530 and an radio frequency (RF) transceiver 506. Memory 535, one or more processors 530, and RF transceiver 506 may communicate internally via a bus 525. In some examples, memory 535 and one or more processors 530 may be part of the same hardware component (e.g., may be part of a same board, module, or integrated circuit). Alternatively, memory 535 and one or more processors 530 may be separate components that may act in conjunction with one another. In some aspects, bus 525 may be a communication system that transfers data between multiple components and subcomponents of network device 310. In some examples, one or more processors 530 may include any one or combination of modem processor, baseband processor, digital signal processor, and/or transmit processor. Additionally or alternatively, one or more processors 530 may include an access manager 220 for carrying out one or more methods or procedures described herein. Access manager 220 may comprise hardware, firmware, and/or software and may be configured to execute code or perform instructions stored in a memory (e.g., a computer-readable storage medium). In an aspect, one or more processors 530 may include a modem 510, which may be configured to perform Wi-Fi and/or cellular operations. In one example (not shown), one or more processors 530 may include separate modems for WLAN (e.g., Wi-Fi network) operations and WWAN (e.g., cellular network) operations. In an aspect, access manager 220 may be implemented or included as part of modem 510.

In some examples, memory 535 may be configured for storing data used herein and/or local versions of applications or access manager 220 and/or one or more of its subcomponents being executed by one or more processors 530. Memory 535 can include any type of computer-readable medium usable by a computer or a processor 530, such as random access memory (RAM), read only memory (ROM), tapes, magnetic discs, optical discs, volatile memory, non-volatile memory, and any combination thereof. In an aspect, for example, memory 535 may be a computer-readable storage medium (e.g., a non-transitory medium) that stores computer-executable code. The computer-executable code may define one or more operations or functions of access manager 220 and/or one or more of its subcomponents, and/or data associated therewith. The computer-executable code may define these one or more operations or functions when network device 310 is operating processor 530 to execute access manager 220 and/or one or more of its subcomponents to handle network access operations as described herein.

In some examples, RF transceiver 506 may include a transmitter 534 for transmitting one or more data and control signals via antenna(s) 502. RF transceiver 506 may also include a receiver 532 for receiving one or more data and control signals via antenna(s) 502. RF transceiver 506 may comprise hardware, firmware, and/or software and may be configured to execute code or perform instructions stored in a memory (e.g., a computer-readable storage medium). Similarly, RF front end 504 in network device 310 may be configured according to communication operations to be performed. For example, one or more of switches 562, 563, and 566, filter(s) 564, low-noise amplifier(s) (LNA(s)) 561, or power amplifier(s) (PA(s)) 565, may be configured according to different communication operations.

Access manager 220 may include an operator identification component 570, a WWAN access component 571, a core configuration and management component 572, a request/message/indication component 573, an approved operators 574, and an advertisement component 575.

Operator identification component 570 may be configured to identify that a subscriber requesting WWAN access is associated with an operator that is an approved operator for network device 310 to provide WWAN access. The operator can be a home network operator or a MVNO and a list of approved operators may be stored in approved operators 574 and/or in memory 535. Operator identification component 570 may be implemented as a hardware component separate from other hardware components in access manager 220, or may be implemented as a combination of hardware and software using processors 530 and memory 535, or may be implemented as software or firmware executing or operating on processors 530 based on instructions stored on memory 535.

WWAN access component 571 may be configured to perform operations and/or establish appropriate connections or communications to allow a subscriber of an approved operator to gain or obtain WWAN access to the subscriber's home network through the approved operator's core network. WWAN access component 571 may be implemented as a hardware component separate from other hardware components in access manager 220, or may be implemented as a combination of hardware and software using processors 530 and memory 535, or may be implemented as software or firmware executing or operating on processors 530 based on instructions stored on memory 535.

Core configuration and management component 572 may be configured to establish and/or manage one or more processing cores associated with different operators. For example, core configuration and management component 572 may be configured to establish and operate separate processing cores (e.g., cores 'a', 'b', and 'N' in FIG. 3) as operator domains and to operate or execute a virtual machine manager (e.g., hypervisor 330 in FIG. 3) to control the partitioning between the different operator domains. Core configuration and management component 572 may be implemented as a hardware component separate from other hardware components in access manager 220, or may be implemented as a combination of hardware and software using processors 530 and memory 535, or may be implemented as software or firmware executing or operating on processors 530 based on instructions stored on memory 535.

Request/message/indication component 573 may be configured to process and handle received messages and/or requests; to generate, process, and handle messages or other type of communication to be broadcast or advertised; and/or to generate, process, and handle indications such as indications associated with advertisement of operator support and asset operation services. Request/message/indication component 573, along with WWAN access component 571 and advertisement component 575 may be configured to perform aspects of the call flow 450 shown in FIG. 4B. Request/message/indication component 573 may be implemented as a hardware component separate from other hardware components in access manager 220, or may be implemented as a combination of hardware and software using processors 530 and memory 535, or may be implemented as software or firmware executing or operating on processors 530 based on instructions stored on memory 535.

Advertisement component 575 may be configured to determine when to advertise asset operator services and which types of asset operator services to advertise. Aspects of advertisement component 575 may be programmed or configured by the asset operator in response to agreements established with other operators. In an aspect, the asset operator that owns or controls network device 310 may configure the appropriate advertisement information, including any advertisement scheduling. Advertisement component 575 may be implemented as a hardware component separate from other hardware components in access manager 220, or may be implemented as a combination of hardware and software using processors 530 and memory 535, or may be implemented as software or firmware executing or operating on processors 530 based on instructions stored on memory 535.

FIG. 6 shows a block diagram 600 illustrating an example of a UE 104 that supports network access via different operators. UE 104 may be an example of the UEs described above in FIGS. 2B, 3, and 4A-4C, for example. As such, UE 104 in FIG. 6 may subscribe or may be a subscriber device to an operator such as a network operator or an MVNO. In some instances, UE 104 may subscribe or may be a subscriber device to more than one operator.

UE 104 may be configured to receive broadcast or advertised information from a network device (e.g., network device 310) associated with an asset operator different from the operator of UE 104. UE 104 may be further configured to identify, based on the information, the asset operator as one of one or more asset operators supported by UE 104 as configured by the operator. UE 104 may be also configured to transmit, to the network device, a request for WWAN access in response to identifying that the asset operator is one of the one or more asset operators supported (or approved) by the UE, where the network device is configured to provide WWAN access to subscribers of the operator via a core network associated with the operator based at least in part on a services agreement between the operator and the asset operator. UE 104 may be configured to receive, from the network device, information from a server of the operator (e.g., Operator A server 430 in FIG. 4A), where the information is provided by the server in response to the request and to establish a connection for WWAN access between the network device and UE 104. UE 104 is also configured to establish the connection with the network device for WWAN access.

In an aspect, the broadcast or advertised information from the network device may include in one or more fields of one or more MIBs or SIBSs at least one of: an indication of a PLMN identity associated with the operator, an indication of multiple PLMN identities associated with the operator, an indication to the UE to query whether the operator to which the UE subscribes is supported by network device 310, an indication that a PLMN identity will be supported at a later time by network device 310, or an indication of different service levels or class types for a PLMN identity associated with the operator.

In accordance with the present disclosure, UE 104 may include a memory 635, one or more processors 630 and an RF transceiver 606. Memory 635, one or more processors 630, and RF transceiver 606 may communicate internally via a bus 625. In some examples, memory 635 and one or more processors 630 may be part of the same hardware component (e.g., may be part of a same board, module, or integrated circuit). Alternatively, memory 635 and one or more processors 630 may be separate components that may act in conjunction with one another. In some aspects, bus 625 may be a communication system that transfers data between multiple components and subcomponents of UE 104. In some examples, one or more processors 630 may include any one or combination of modem processor, baseband processor, digital signal processor, and/or transmit processor. Additionally or alternatively, one or more processors 630 may include an access manager 210 for carrying out one or more methods or procedures described herein. Access manager 210 may comprise hardware, firmware, and/or software and may be configured to execute code or perform instructions stored in a memory (e.g., a computer-readable storage medium). In an aspect, one or more processors 630 may include a modem 610, which may be configured to perform Wi-Fi and/or cellular operations. In one example (not shown), one or more processors 630 may include separate modems for WLAN (e.g., Wi-Fi network) operations and WWAN (e.g., cellular network) operations. In an aspect, access manager 210 may be implemented or included as part of modem 610.

In some examples, memory 635 may be configured for storing data used herein and/or local versions of applications or access manager 210 and/or one or more of its subcomponents being executed by one or more processors 630. Memory 635 can include any type of computer-readable medium usable by a computer or a processor 630, such as random access memory (RAM), read only memory (ROM), tapes, magnetic discs, optical discs, volatile memory, non-volatile memory, and any combination thereof. In an aspect, for example, memory 635 may be a computer-readable storage medium (e.g., a non-transitory medium) that stores computer-executable code. The computer-executable code may define one or more operations or functions of access manager 210 and/or one or more of its subcomponents, and/or data associated therewith. The computer-executable code may define these one or more operations or functions when UE 104 is operating processor 630 to execute access manager 210 and/or one or more of its subcomponents to handle network access operations as described herein.

In some examples, RF transceiver 606 may include a transmitter 634 for transmitting one or more data and control signals via antenna(s) 602. RF transceiver 606 may also include a receiver 632 for receiving one or more data and control signals via antenna(s) 602. RF transceiver 606 may comprise hardware, firmware, and/or software and may be configured to execute code or perform instructions stored in a memory (e.g., a computer-readable storage medium). Similarly, RF front end 604 in UE 104 may be configured according to communication operations to be performed. For example, one or more of switches 662, 663, and 667, filter(s) 664, LNA(s) 661, or PA(s) 665, may be configured according to different communication operations.

Access manager 210 may include an operator identification component 670, a WWAN access component 671, a broadcast/server information component 672, a request/message/indication component 673, and an approved asset operators 674.

Operator identification component 670 may be configured to identify that a broadcast or advertised asset operator is an approved asset operator for UE 104 to provide WWAN access. A list of approved asset operators may be stored in approved asset operators 674 and/or in memory 635. Operator identification component 670 may be implemented as a hardware component separate from other hardware components in access manager 210, or may be implemented as a combination of hardware and software using processors 630 and memory 635, or may be implemented as software or firmware executing or operating on processors 630 based on instructions stored on memory 635.

WWAN access component 671 may be configured to perform operations and/or establish appropriate connections or communications to allow UE 104 to gain or obtain WWAN access to its home network using a network device associated with the approved asset operator. WWAN access component 671 may be implemented as a hardware component separate from other hardware components in access manager 210, or may be implemented as a combination of hardware and software using processors 630 and memory 635, or may be implemented as software or firmware executing or operating on processors 630 based on instructions stored on memory 635.

Broadcast/server information component 672 may be configured to process and handle received information associated with advertisement of asset operator services by a network device. Broadcast/server information component 672 along with request/message/indication component 673 may be configured to perform aspects of the call flow 450 shown in FIG. 4B. Broadcast/server information component 672 may be implemented as a hardware component separate from other hardware components in access manager 210, or may be implemented as a combination of hardware and software using processors 630 and memory 635, or may be implemented as software or firmware executing or operating on processors 630 based on instructions stored on memory 635.

Request/message/indication component 673 may be configured to generate, process, and handle messages and/or requests; to process and handle messages or other type of communication broadcast or advertised from a network device; and/or to process and handle indications such as indications associated with advertisement of operator support and asset operation services by a network device. Request/message/indication component 673 may be implemented as a hardware component separate from other hardware components in access manager 210, or may be implemented as a combination of hardware and software using processors 630 and memory 635, or may be implemented as software or firmware executing or operating on processors 630 based on instructions stored on memory 635.

The aspects described above with respect to FIGS. 5 and 6 may apply to more general descriptions of network devices and UEs. For example, FIG. 7 shows an eNB 710 in communication with a UE 750 in an access network. eNB 710 may correspond to a network device of an asset operator such as network device 310 in FIG. 5. Similarly, UE 750 may correspond to a UE subscribed to a network operator or an MVNO such as UE 104 in FIG. 6.

With respect to the description of FIG. 7, in the downlink, internet protocol (IP) packets from a core network (e.g., EPC 160) may be provided to a controller/processor 775. Controller/processor 775 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. Controller/processor 775 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

A transmit (TX) processor 716 and a receive (RX) processor 770 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. TX processor 716 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by UE 750. Each spatial stream may then be provided to a different antenna 720 via a separate transmitter 718TX. Each transmitter 718TX may modulate an RF carrier with a respective spatial stream for transmission.

In addition, in a scenario where eNB 710 corresponds to an asset operator network device such as network device 310 (or base station 103' in FIG. 2B) implementing techniques of the present disclosure, one or more of controller/processor 775, TX processor 716, or RX processor 770 may include a plurality of processing cores or other partitioned processing units (e.g., cores 'a', 'b', and 'N' in FIG. 3). Each of the processing cores or processing units are associated with communications between a particular home core network and one or more UEs obtaining wireless network access via eNB 710 that are subscribers of the home network. Moreover, where eNB 710 corresponds to network device 310 in FIG. 5, then one or more of controller/processor 775, TX processor 716, or RX processor 770 may correspond to processor(s) 530, and memory 776 may correspond to memory 535.

At UE 750, each receiver 754RX receives a signal through its respective antenna 752. Each receiver 754RX recovers information modulated onto an RF carrier and provides the information to the receive (RX) processor 756. TX processor 768 and RX processor 756 implement layer 1 functionality associated with various signal processing functions. RX processor 756 may perform spatial processing on the information to recover any spatial streams destined for UE 750. If multiple spatial streams are destined for UE 750, they may be combined by RX processor 756 into a single OFDM symbol stream. RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by eNB 710. These soft decisions may be based on channel estimates computed by channel estimator 758. The soft decisions are then decoded and deinterleaved to recover the data and control signals that were originally transmitted by eNB 710 on the physical channel. The data and control signals are then provided to controller/processor 759, which implements layer 3 and layer 2 functionality.

Controller/processor 759 can be associated with a memory 760 that stores program codes and data. Memory 760 may be referred to as a (non-transitory) computer-readable medium. In the uplink, controller/processor 759 provides demultiplexing between transport and logical channels, packet reassembly, deciphering, header decompression, and control signal processing to recover IP packets from the core network. Controller/processor 759 is also responsible for error detection using an ACK and/or NACK protocol to support HARQ operations.

Similar to the functionality described in connection with the downlink transmission by eNB 710, controller/processor 759 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 758 from a reference signal or feedback transmitted by eNB 710 may be used by the TX processor 768 to select the appropriate coding and modulation schemes, and to facilitate spatial processing. The spatial streams generated by the TX processor 768 may be provided to different antenna 752 via separate transmitters 754TX. Each transmitter 754TX may modulate an RF carrier with a respective spatial stream for transmission.

The uplink transmission is processed at eNB 710 in a manner similar to that described in connection with the receiver function at UE 750. Each receiver 718RX receives a signal through its respective antenna 720. Each receiver 718RX recovers information modulated onto an RF carrier and provides the information to a RX processor 770.

Controller/processor 775 can be associated with memory 776 that stores program codes and data. Memory 776 may be referred to as a (non-transitory) computer-readable medium. In the uplink, controller/processor 775 provides demultiplexing between transport and logical channels, packet reassembly, deciphering, header decompression, control signal processing to recover IP packets from UE 750. IP packets from controller/processor 775 may be provided to the core network (e.g., EPC 160). Controller/processor 775 is also responsible for error detection using an ACK and/or NACK protocol to support HARQ operations.

Where UE 750 corresponds to UE 104 in FIG. 6, then one or more of controller/processor 759, TX processor 768, or RX processor 756 may correspond to processor(s) 630, and memory 760 may correspond to memory 635.

Also shown in FIG. 7 is access manager 220 coupled to controller/processor 775 in eNB 710, where access manager 220 is described in more detail above with respect to FIG. 5. FIG. 7 also shows access manager 210 coupled to controller/processor 759 in UE 750, where access manager 210 is described in more detail above with respect to FIG. 6. While access manager 220 is shown coupled to controller/processor 775, this is by way of example and access manager 220 may be coupled to, or be part of, one or more of controller/processor 775, TX processor 716, or RX processor 770. Similarly, access manager 210 is shown coupled to controller/processor 759, this is by way of example and access manager 220 may be coupled to, or be part of, one or more of controller/processor 759, TX processor 768, or RX processor 756.

As described above, the techniques described herein for network access involve communications between a UE subscribed to a network operator or MVNO and infrastructure (e.g., network device) owned or controlled by an asset operator. These communications involve different signaling and resources for exchanging the appropriate information. For cellular communications, such as those based on LTE technology, there are structured frames used in transmitting and receiving data and/or control information.

Figure 8:
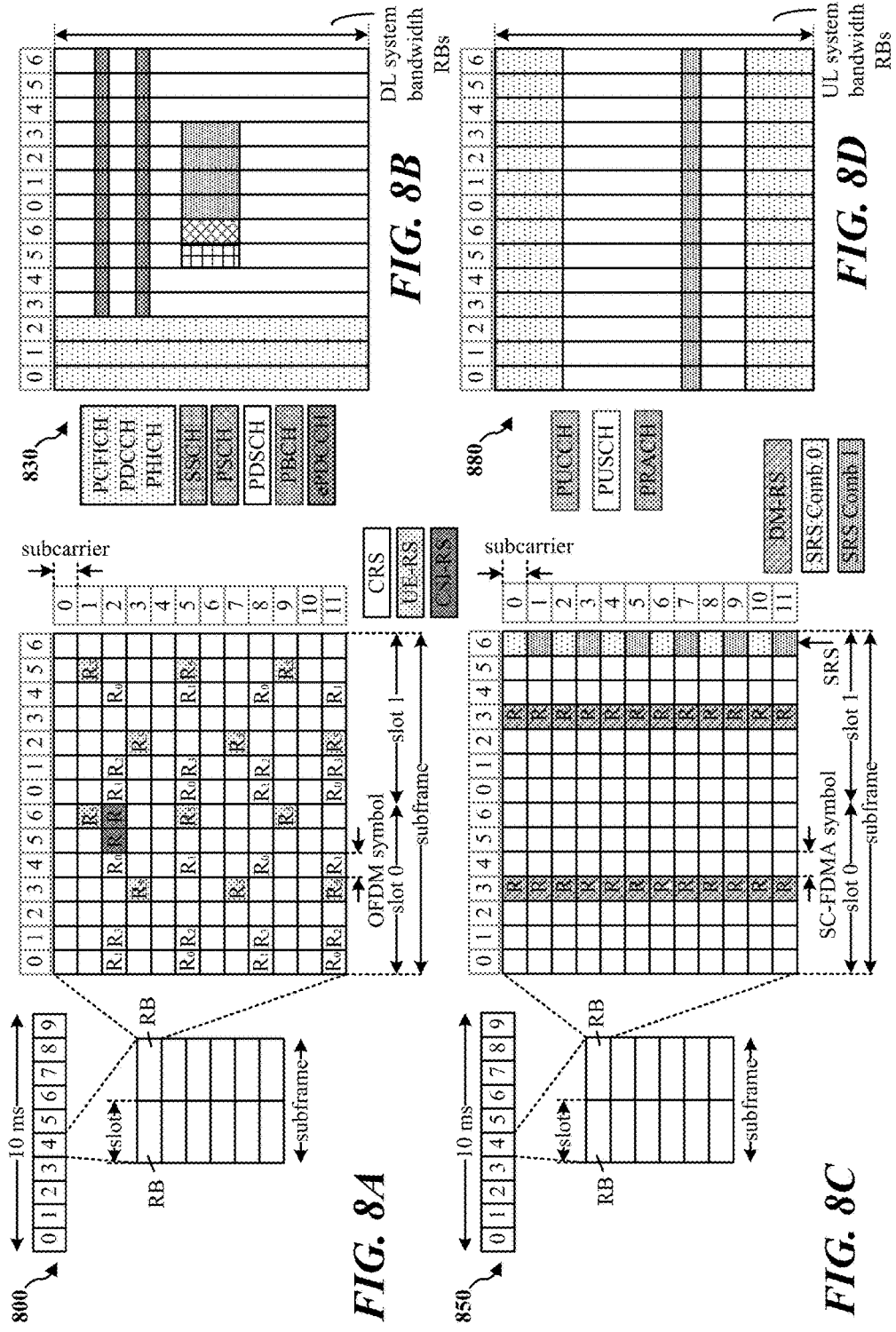
FIGS. 8A, 8B, 8C, and 8D are diagrams illustrating LTE examples of a DL frame structure, DL channels within the DL frame structure, an UL frame structure, and UL channels within the UL frame structure, respectively.

FIG. 8A shows a diagram 800 illustrating an example of a downlink (DL) frame structure in LTE, which may be utilized for communication between network device 310 of the present disclosure and one or more UEs 104. FIG. 8B is a diagram 830 illustrating an example of channels within the DL frame structure in LTE. FIG. 8C is a diagram 850 illustrating an example of an uplink (UL) frame structure in LTE, which may be utilized for communication between network device 310 of the present disclosure and one or more UEs 104. FIG. 8D is a diagram 880 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 8A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 3A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 8B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 8B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 8B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 8C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 8D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 9:
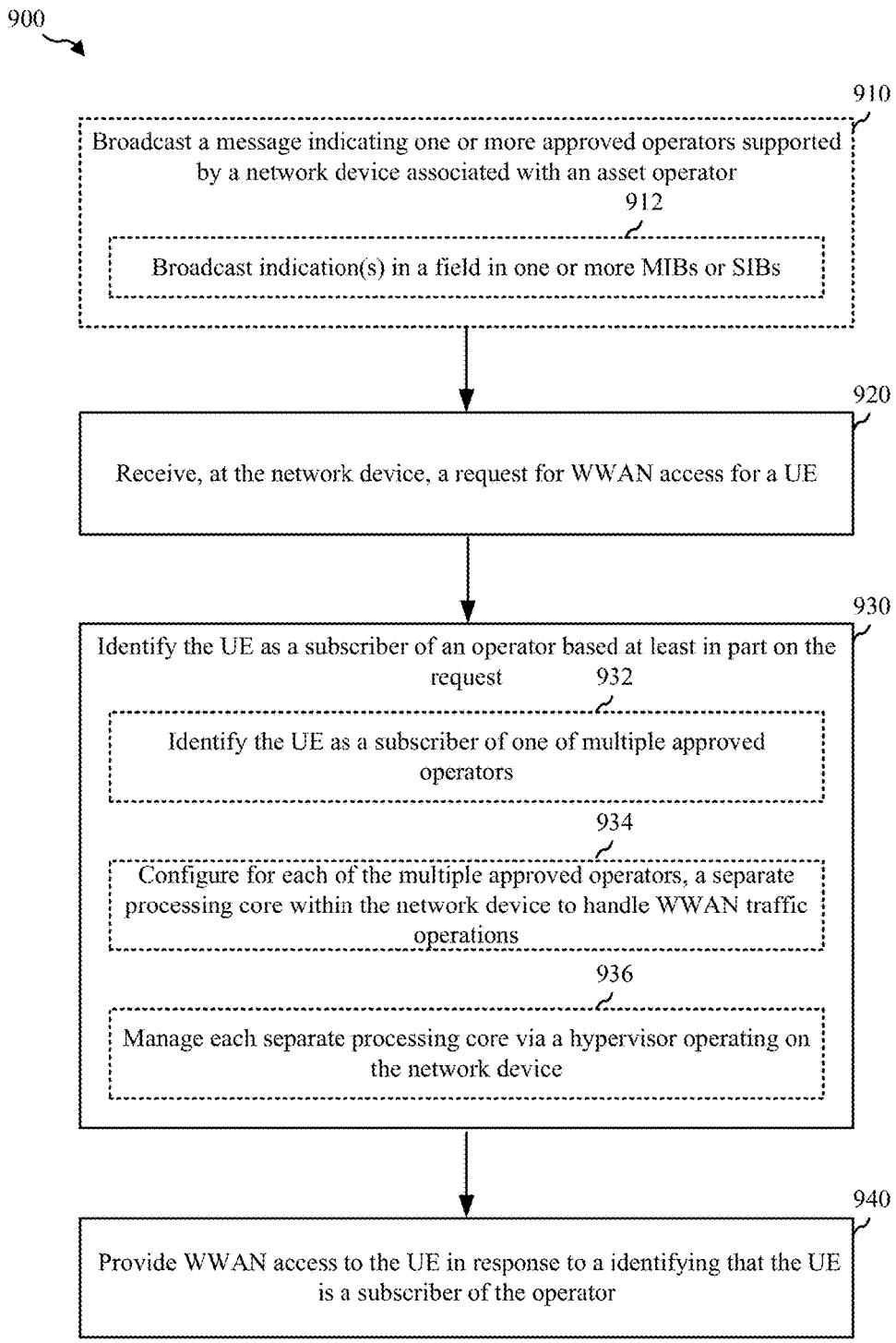
FIG. 9 is a flowchart illustrating an example of a method of wireless communications.
Figure 10:
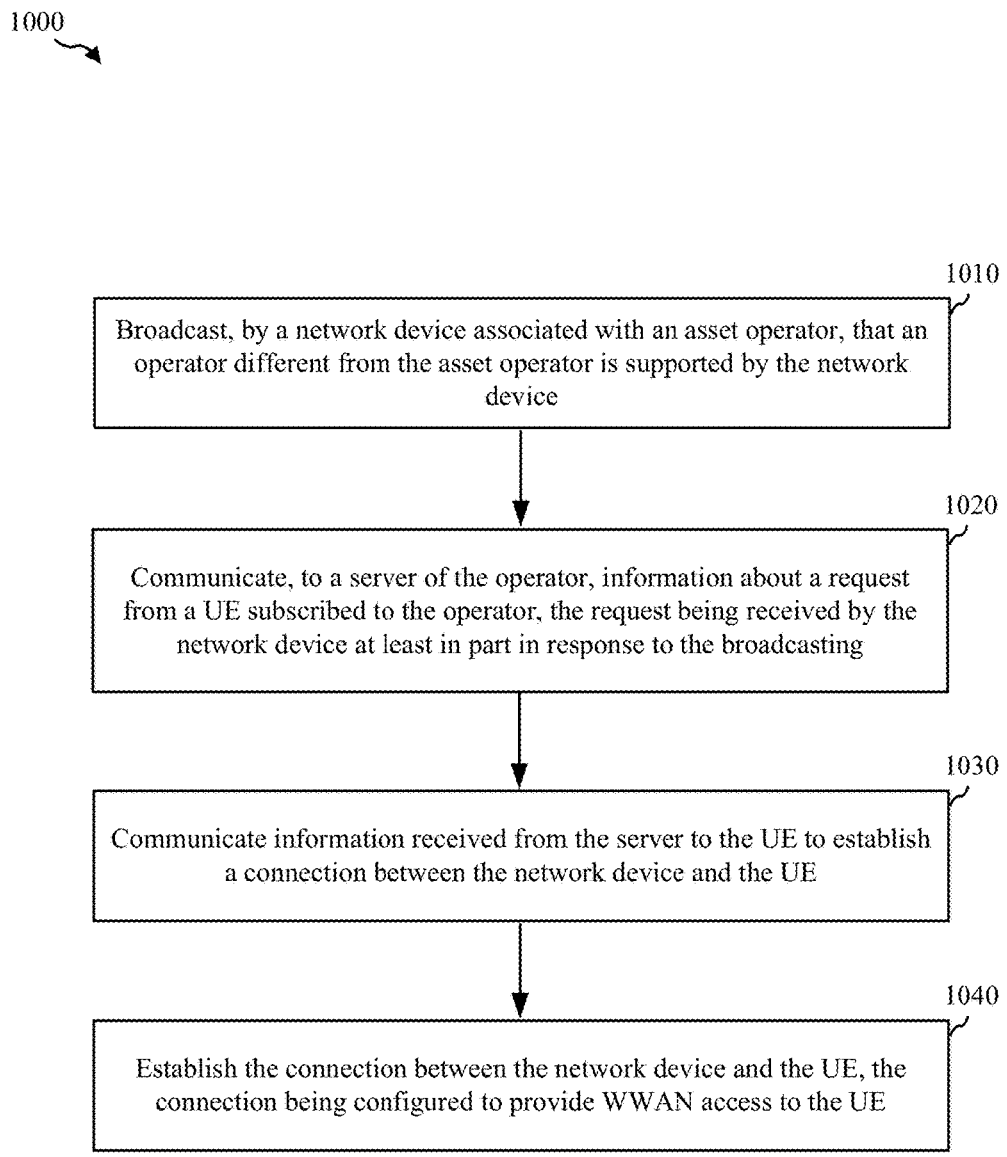
FIG. 10 is a flowchart illustrating an example of advertising aspects of a method of wireless communications.

Referring to FIGS. 9 and 10, examples of one or more operations of access manager 220 (FIGS. 2B, 4A, 4C, 5, and 7) according to the present apparatus, methods, and computer-readable medium are described with reference to one or more methods and one or more elements or components that may perform the actions of these methods. It is to be understood that access manager 220 may be implemented using memory 535 and/or processor(s) 530, the latter of which may include modem 510. In an aspect, at least a portion of access manager 220 may be implemented as part of modem 510. Although the operations described below are presented in a particular order and/or as being performed by an example element or component, it should be understood that the ordering of the actions and the elements or components performing the actions may be varied, depending on the implementation. Also, although access manager 220 is illustrated as having a number of subcomponents, it should be understood that one or more of the illustrated subcomponents may be separate from, but in communication with, access manager 220 and/or each other. It should be understood that the following actions or components described with respect to access manager 220 and/or its subcomponents may be performed by a specially-programmed processor, a processor executing specially-programmed software or computer-readable media, or by any other combination of a hardware component and/or a software component specially configured for performing the described actions or components. Moreover, each of the following actions or components may be implemented by a respective means, which has a corresponding hardware component as illustrated in connection with FIGS. 5 and 7.

With respect to FIG. 9, at block 910, method 900 for wireless communications may optionally include broadcasting or advertising a message indicating one or more approved operators supported by a network device associated with an asset operator. For example, network device 310 may broadcast or advertise to UEs in its coverage area that network device 310 is configured to provide WWAN access to UEs that subscribe to certain operators. In an aspect, the functions associated with block 910 may be performed by network device 310, access manager 220, request/message/indication component 573, advertisement component 575, and/or RF transceiver 506. Optionally, at block 912, the broadcast or advertized message may include approved operators in indications associated with a field in one or more MIBs or SIBs.

At block 920, method 900 may include receiving, at the network device, a request for WWAN access for a UE. For example, network device 310 may receive a request from a UE 104 subscribed to an operator (e.g., a network operator or MVNO) to gain or obtain WWAN access to the core network of the operator through network device 310. In an aspect, the functions associated with block 920 may be performed by at least network device 310, access manager 220, request/message/indication component 573, and/or RF transceiver 506.

At block 930, method 900 may include identifying the UE as a subscriber of an operator based at least in part on the request. For example, network device 310 may identify that a UE 104 that sent a request to network device 310 is subscribed to a particular operator. Optionally at block 932, the network device may identify the UE to be a subscriber of one or multiple approved operators. For example, network device 310 may identify a UE 104 to be a subscriber of one of the approved operators 574. Optionally at block 934, the network device may configure for each of the multiple approved operators, a separate processing core within the network device to handle WWAN traffic operations. For example, network device 310 may configure multiple processing cores (e.g., cores 'a', 'b'. and 'N' in processing system 320 of FIG. 3), where each processing core handles traffic to a core network of a respective operator (e.g., operators 'a', 'b', and 'N' in FIG. 3). Optionally, at block 936, the network device may manage each of the separate processing cores via a hypervisor operating on the network device. For example, network device 310 may have hypervisor 330 manage processing cores 'a', 'b', and 'N' as shown in FIG. 3. In an aspect, the functions associated with blocks 930, 932, 934, and 936 may be performed by at least network device 310, access manager 220, operator identification component 570, approved operators 574, and/or core configuration and management component 572.

At block 940, method 900 may include providing WWAN access to the UE in response to identifying that the UE is a subscriber of the operator. For example, network device 310 may identify that a UE 104 that sent a request to network device 310 is subscribed to an approved operator and may provide WWAN access to that UE 104 as a result. In an aspect, the functions associated with block 940 may be performed by at least network device 310, access manager 220, operator identification component 570, approved operators 574, WWAN access component 571 and/or RF transceiver 506.

With respect to FIG. 10, at block 1010, method 1000 for wireless communications may include broadcasting or advertising, by a network device associated with an asset operator, that an operator different from the asset operator is supported by the network device. For example, network device 310 may broadcast or advertise support for approved operators, such as network operators or MVNOs that are different than the asset operator to which network device 310 is associated. Such broadcasting or advertising is illustrated in, for example, FIGS. 4A and 4B (e.g., call flow diagram 450). In an aspect, network device 310 may provide indications of the approved operators (e.g., PLMN identities) in a field or fields of MIBs and/or SIBs transmitted by network device 310. In another aspect, the functions associated with block 1010 may be performed by network device 310, access manager 220, request/message/indication component 573, advertisement component 575, and/or RF transceiver 506.

At block 1020, method 1000 may include communicating, to a server of the operator, information about a request from a UE subscribed to the operator, where the request is received by the network device at least in part in response to the broadcasting or advertising. For example, as shown in FIGS. 4A and 4B (e.g., call flow diagram 450), network device 310 may receive a request from UE 104-*a* subscribed to Operator A, and may communicate to Operator A server 430 information about the request (e.g., relay or forward the request or information contained in the request). In an aspect, the functions associated with block 1020 may be performed by network device 310, access manager 220, request/message/indication component 573, WWAN access component 571, and/or RF transceiver 506.

At block 1030, method 1000 may include communicating information received from the server to the UE to establish a connection between the network device and the UE. For example, as shown in FIGS. 4A and 4B (e.g., call flow diagram 450), network device 310 may receive information from Operator A server 430, and may communicate the information to UE 104-*a* (e.g., relay or forward a response from the server or information contained in the response). In an aspect, the functions associated with block 1030 may be performed by network device 310, access manager 220, request/message/indication component 573, WWAN access component 571, and/or RF transceiver 506.

At block 1040, method 1000 may include establishing a connection between the network device and the UE, where the connection is configured to provide WWAN access to the UE. For example, network device 310 may establish a connection with a UE 104 subscribed to an operator supported by network device 310 to allow UE 104 to access its own home network using the operator's core network. In an aspect, the functions associated with block 1030 may be performed by network device 310, access manager 220, WWAN access component 571, and/or RF transceiver 506.

Figure 11:
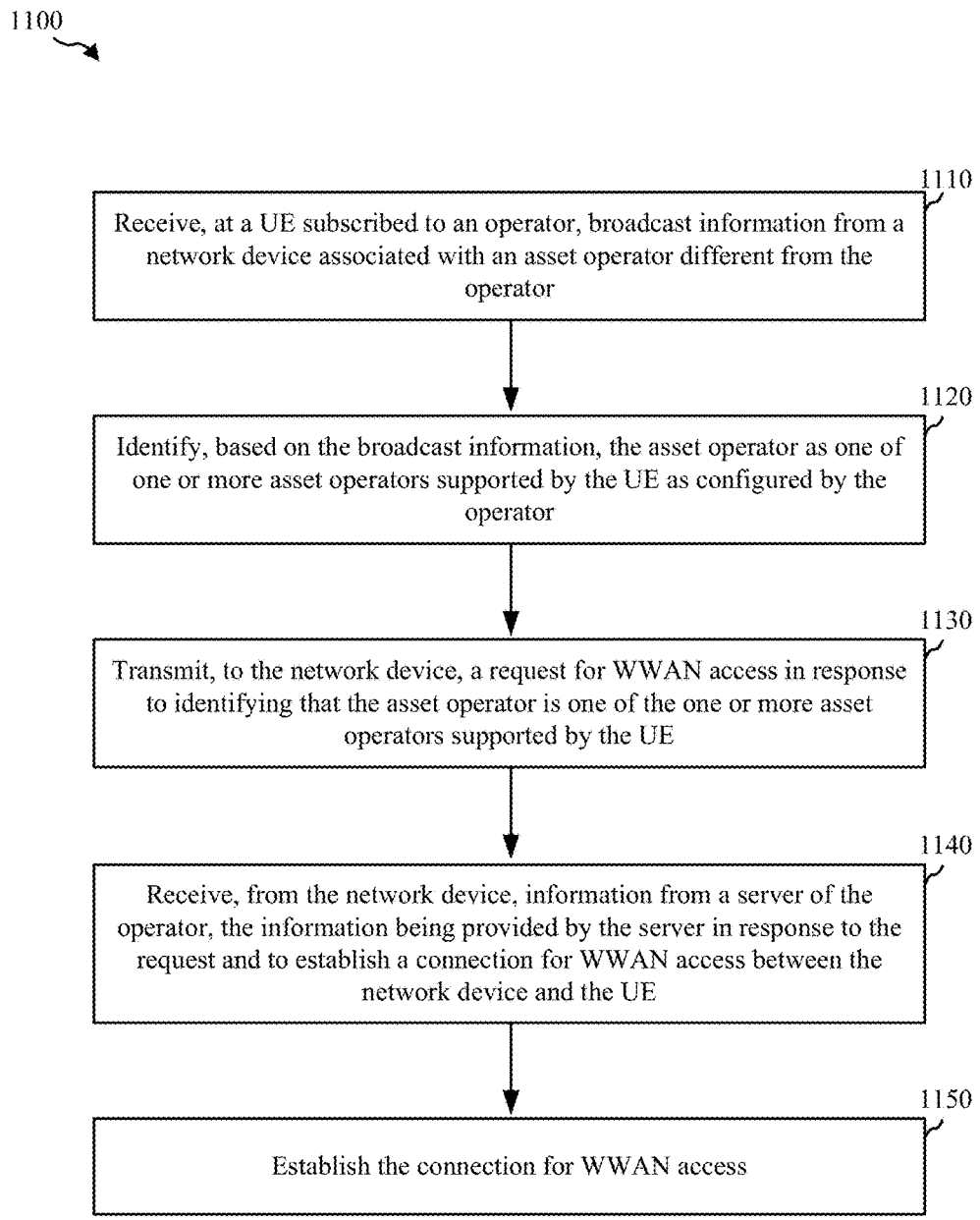
FIG. 11 is a flowchart illustrating an example of another method of wireless communications.

Referring to FIG. 11, examples of one or more operations of access manager 210 (FIGS. 2B, 4A, 4C, 6, and 7) according to the present apparatus, methods, and computer-readable medium are described with reference to one or more methods and one or more elements or components that may perform the actions of these methods. It is to be understood that access manager 210 may be implemented using memory 635 and/or processor(s) 630, the latter of which may include modem 610. In an aspect, at least a portion of access manager 210 may be implemented as part of modem 610. Although the operations described below are presented in a particular order and/or as being performed by an example element or component, it should be understood that the ordering of the actions and the elements or components performing the actions may be varied, depending on the implementation. Also, although access manager 210 is illustrated as having a number of subcomponents, it should be understood that one or more of the illustrated subcomponents may be separate from, but in communication with, access manager 210 and/or each other. It should be understood that the following actions or components described with respect to access manager 210 and/or its subcomponents may be performed by a specially-programmed processor, a processor executing specially-programmed software or computer-readable media, or by any other combination of a hardware component and/or a software component specially configured for performing the described actions or components. Moreover, each of the following actions or components may be implemented by a respective means, which has a corresponding hardware component as illustrated in connection with FIGS. 6 and 7.

With respect to FIG. 11, at block 1110, method 1100 may include receiving, at a UE subscribed to an operator, broadcast or advertised information from a network device associated with an asset operator different from the operator. For example, a UE 104 may receive an indication (e.g., a field in an MIB or SIB) in a broadcast message from network device 310, where the broadcast message advertises which operators (e.g., network operators or MVNOs) are supported (or which services are supported for certain operators) by network device 310. In an aspect, the functions associated with block 1110 may be performed at least by UE 104 (e.g., FIG. 6), access manager 210, broadcast/server information component 672, request/message/indication component 673, and/or RF transceiver 606.

At block 1120, method 1100 may include identifying, based on the broadcast information, the asset operator as one of the one or more asset operators supported by the UE as configured by the operator. For example, a UE 104 may identify network device 310 as being associated with an asset operator supported by UE 104 based on the information broadcast or advertised by network device 310. In an aspect, the functions associated with block 1120 may be performed at least by UE 104 (e.g., FIG. 6), access manager 210, operator identification component 670, broadcast/server information component 672, and/or request/message/indication component 673.

At block 1130, method 1100 may include transmitting, to the network device, a request for WWAN access in response to identifying that the asset operator is one of the one or more asset operators supported by the UE. For example, UE 104 may send a request to network device 310 for WWAN access when network device 310 is identified by UE 104 to be an approved and available asset operator that supports access to the home network of UE 104. In an aspect, the functions associated with block 1130 may be performed at least by UE 104 (e.g., FIG. 6), access manager 210, operator identification component 670, request/message/indication component 673, and/or RF transceiver 606.

At block 1140, method 1100 may include receiving, from the network device, information from a server of the operator, where the information is provided by the server in response to the request and to establish a connection for WWAN access between the network device and the UE. For example, as shown in FIGS. 4A and 4B (e.g., call flow diagram 450), network device 310 may receive information from Operator A server 430, and may communicate the information to UE 104-a (e.g., relay or forward a response from the server or information contained in the response). In an aspect, the functions associated with block 1140 may be performed at least by UE 104 (e.g., FIG. 6), access manager 210, WWAN access component 671, broadcast/server information component 672, request/message/indication component 673, and/or RF transceiver 606.

At block 1150, method 1100 may include establishing the connection for WWAN access with the network device. For example, a UE 104 may establish a connection with network device 310 associated with an access operator supported by UE 104 to allow UE 104 to access its own home network using the operator's core network. In an aspect, the functions associated with block 1150 may be performed at least by UE 104 (e.g., FIG. 6), access manager 210, WWAN access component 671, and/or RF transceiver 606.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications by a network device, comprising:

receiving, at the network device, a request for wireless wide area network (WWAN) access for a user equipment (UE);

identifying, by the network device, the UE as a subscriber of a first operator based at least in part on the request, the first operator being a different type of operator from a second operator that is an asset operator, the network device being an asset of the asset operator, and the network device being configured to provide WWAN access to subscribers of the first operator via assets of the asset operator and a core network associated with the first operator based at least in part on a services agreement between the first operator and the asset operator; and providing, by the network device, WWAN access to the UE in response to identifying that the UE is a subscriber of the first operator.

2. The method of claim 1, wherein:

the first operator is a mobile virtual network operator (MVNO) for the UE and the asset operator provides access to one or both of network infrastructure assets or wireless spectrum assets of the asset operator to subscribers of the MVNO, the network infrastructure assets including the network device, or the first operator is a home network operator for the UE and the asset operator provides access to one or both of network infrastructure assets or wireless spectrum assets of the asset operator to subscribers of the home network operator, the network infrastructure assets including the network device.

3. The method of claim 1, wherein the network device is configured to provide WWAN access via unlicensed or shared wireless spectrum assets of the asset operator.

4. The method of claim 1, wherein identifying the UE as a subscriber of the first operator includes identifying the UE as a subscriber of one of multiple approved operators including the first operator, the network device being configured to provide WWAN access to subscribers of each approved operator via assets of the asset operator and a core network associated with the respective approved operator based at least in part on a services agreement between the approved operator and the asset operator.

5. The method of claim 4, further comprising:

configuring, for each of the multiple approved operators, a separate processing core within the network device to handle processing related to WWAN communication and traffic operations, each processing core being a different operator domain partition in a processing system; and managing each separate processing core via a hypervisor operating on the network device.

6. The method of claim 1, further comprising broadcasting a message indicating one or more approved operators, including the first operator, supported by the network device, wherein the request for WWAN access for the UE is received in response to the message.

7. The method of claim 6, wherein the message specifies a time during which WWAN access is available via the network device to subscribers of each of the one or more approved operators.

8. The method of claim 1, further comprising:

broadcasting, by the network device, that the first operator is supported by the network device;

communicating information about the request to a server of the first operator, the request being received at least in part in response to the broadcasting;

communicating information received from the server to the UE to establish a connection between the network device and the UE; and establishing the connection between the network device and the UE, the connection being configured to provide WWAN access to the UE.

9. The method of claim 1, further comprising broadcasting in a field in a master information block (MIB) or in a system information block (SIB) an indication of a public land mobile network (PLMN) identity associated with the first operator, wherein the request is received at least in part on the broadcasting.

10. The method of claim 1, further comprising broadcasting in a field in one or more MIBs or SIBs one or more of:

an indication of a PLMN identity associated with the first operator, an indication of multiple PLMN identities associated with the first operator, an indication to the UE to query whether the first operator to which the UE subscribes is supported by the network device, an indication that a PLMN identity will be supported at a later time by the network device, or an indication of different service levels for a PLMN identity associated with the first operator.

11. The method of claim 1, wherein the request is based on information indicating one or more of geographic, temporal, or quality-of-service requirements for WWAN access.

12. The method of claim 1, wherein the first operator provides a coverage area different from a coverage area provided by a deployment of network infrastructure assets of the asset operator.

13. The method of claim 12, wherein the deployment of the network infrastructure assets includes multiple small cells and the network device is one of the multiple small cells.

14. The method of claim 1, wherein the network device is a small cell or a macro cell.

15. The method of claim 1, wherein the asset operator has no associated subscribers.

16. The method of claim 1, wherein the asset operator has a deployment of at least network infrastructure assets including the network device in specific locations and accessible during specific times.

17. A non-transitory computer-readable medium storing computer executable code for wireless communications by a network device, comprising:

code for receiving, at the network device, a request for wireless wide area network (WWAN) access for a user equipment (UE);

code for identifying, by the network device, the UE as a subscriber of a first operator based at least in part on the request, the first operator being a different type of operator from a second operator that is an asset operator, the network device being an asset of the asset operator, and the network device being configured to provide WWAN access to subscribers of the first operator via assets of the asset operator and a core network associated with the first operator based at least in part on a services agreement between the first operator and the asset operator; and code for providing, by the network device, WWAN access to the UE in response to identifying that the UE is a subscriber of the first operator.

18. A network device for wireless communications, comprising:

a transceiver;

a memory configured to store instructions; and
a processor in communication with the transceiver and the memory, the processor and the memory configured to execute the instructions to:
 receive, at the network device and via the transceiver, a request for wireless wide area network (WWAN) access for a user equipment (UE), the network device being associated with an asset operator;
 identify, by the network device, the UE as a subscriber of a first operator based at least in part on the request, the first operator being a different type of operator from a second operator that is an asset operator, the network device being an asset of the asset operator, and the network device being configured to provide WWAN access to subscribers of the first operator via assets of the asset operator and a core network associated with the first operator based at least in part on a services agreement between the first operator and the asset operator; and
 provide, by the network device, WWAN access to the UE via the transceiver in response to identifying that the UE is a subscriber of the first operator.

19. The network device of claim 18, wherein:
the first operator is a mobile virtual network operator (MVNO) for the UE and the asset operator provides access to one or both of network infrastructure assets or wireless spectrum assets of the asset operator to subscribers of the MVNO, the network infrastructure assets including the network device, or
the first operator is a home network operator for the UE and the asset operator provides access to one or both of network infrastructure assets or wireless spectrum assets of the asset operator to subscribers of the home network operator, the network infrastructure assets including the network device.

20. The network device of claim 18, wherein the network device is configured to provide WWAN access via unlicensed or shared wireless spectrum assets of the asset operator.

21. The network device of claim 18, wherein the processor and the memory identify whether the UE is a subscriber of the first operator by executing instructions to identify whether the UE is a subscriber of one of multiple approved operators including the first operator, the network device being configured to provide WWAN access to subscribers of each approved operator via assets of the asset operator and a core network associated with the respective approved operator based at least in part on a services agreement between the approved operator and the asset operator.

22. The network device of claim 21, wherein the processor and the memory are further configured to execute instructions to:
 configure, for each of the multiple approved operators, a separate processing core within the network device to handle processing related to WWAN communication and traffic operations, each processing core being a different operator domain partition in a processing system; and
 manage each separate processing core via a hypervisor operating on the network device.

23. The network device of claim 18, wherein the processor and the memory are further configured to execute instructions to broadcast a message indicating one or more approved operators, including the first operator, supported by the network device, wherein the request for WWAN access for the UE is received in response to the message.

24. The network device of claim 23, wherein the message specifies a time during which WWAN access is available via the network device to subscribers of each of the one or more approved operators.

25. The network device of claim 18, wherein the processor and the memory are further configured to execute instructions to:
 broadcast, via the transceiver, that the first operator is supported by the network device;
 communicate, via the transceiver, information about the request to a server of the first operator, the request being received at least in part in response to the broadcasting;
 communicate, via the transceiver, information received from the server to the UE to establish a connection between the network device and the UE; and
 establish, via the transceiver, the connection between the network device and the UE, the connection being configured to provide WWAN access to the UE.

26. The network device of claim 18, wherein the processor and the memory are further configured to execute instructions to broadcast, via the transceiver, in a field in a master information block (MIB) or in a system information block (SIB) an indication of a public land mobile network (PLMN) identity associated with the first operator, wherein the request is received at least in part on the broadcasting.

27. The network device of claim 18, wherein the processor and the memory are further configured to execute instructions to broadcast, via the transceiver, in a field in one or more MIBs or SIBs one or more of:
 an indication of a PLMN identity associated with the first operator,
 an indication of multiple PLMN identities associated with the first operator,
 an indication to the UE to query whether the first operator to which the UE subscribes is supported by the network device,
 an indication that a PLMN identity will be supported at a later time by the network device, or
 an indication of different service levels for a PLMN identity associated with the first operator.

28. The network device of claim 18, wherein the request is based on information indicating one or more of geographic, temporal, or quality-of-service requirements for WWAN access.

29. The network device of claim 18, wherein the network device is a small cell or a macro cell that is part of a deployment of network infrastructure assets of the asset operator.

30. The network device of claim 18, wherein the asset operator has no associated subscribers.

31. The network device of claim 18, wherein the asset operator has a deployment of at least network infrastructure assets including the network device in specific locations and accessible during specific times.

32. A method of wireless communications by a user equipment, UE, comprising:
 receiving, at the UE, broadcast information from a network device associated with a second operator that is an asset operator, the asset operator being a different type of operator from a first operator to which the UE is subscribed;
 identifying, by the UE and based on the broadcast information, the asset operator as one of one or more asset operators supported by the UE as configured by the first operator;

transmitting, by the UE to the network device, a request for wireless wide area network (WWAN) access in response to identifying that the asset operator is one of the one or more asset operators supported by the UE;

receiving, by the UE from the network device, information from a server of the first operator, the information being provided by the server in response to the request and to establish a connection for WWAN access between the network device and the UE; and establishing, by the UE with the network device, the connection for WWAN access.

33. The method of claim 32, wherein the broadcast information includes a master information block (MIB) or a system information block (SIB), and a field in the MIB or SIB includes one or more of:

an indication of a public land mobile network (PLMN) identity associated with the first operator, an indication of multiple PLMN identities associated with the first operator, an indication to the UE to query whether the operator to which the UE subscribes is supported by the network device, an indication that a PLMN identity will be supported at a later time by the network device, or an indication of different service levels for a PLMN identity associated with the first operator.

34. The method of claim 32, wherein the first operator is a mobile virtual network operator (MVNO) for the UE or a home network operator for the UE, and the asset operator provides access to one or both of network infrastructure assets or wireless spectrum assets of the asset operator to subscribers of the MVNO or to subscribers of the home network operator.

\* \* \* \* \*